United States Patent [19]
Imai et al.

[11] Patent Number: 6,024,425
[45] Date of Patent: Feb. 15, 2000

[54] STORAGE APPARATUS

[75] Inventors: Masao Imai; Makoto Tanaka, both of Gamou-gun, Japan

[73] Assignee: Daifuku Co., Ltd., Japan

[21] Appl. No.: 08/809,262

[22] PCT Filed: Sep. 11, 1995

[86] PCT No.: PCT/JP95/01799

§ 371 Date: Mar. 13, 1997

§ 102(e) Date: Mar. 13, 1997

[87] PCT Pub. No.: WO96/08429

PCT Pub. Date: Mar. 21, 1996

[30] Foreign Application Priority Data

Sep. 16, 1994 [JP] Japan ..................................... 6-221945

[51] Int. Cl.⁷ ..................................................... A47F 1/00
[52] U.S. Cl. ........................... 312/35; 414/280; 254/286; 254/338; 312/306
[58] Field of Search ..................................... 414/277, 280, 414/281, 282, 283; 312/35, 304, 306, 312, 319.5, 319.7, 280, 281, 282, 334.33, 334.37, 334.39; 108/147, 143, 102; 211/191, 1.51; 254/311, 312, 316, 286, 338

[56] References Cited

U.S. PATENT DOCUMENTS

| | | | |
|---|---|---|---|
| 486,435 | 11/1892 | Conde | 312/334.39 X |
| 1,877,775 | 9/1932 | Ohnstrand | 108/137 X |
| 3,112,034 | 11/1963 | Kaufman et al. | 211/191 |
| 4,394,104 | 7/1983 | Camerini et al. | 414/280 X |
| 5,328,316 | 7/1994 | Hoffman | 414/280 |
| 5,544,996 | 8/1996 | Castaldi et al. | 414/280 |

FOREIGN PATENT DOCUMENTS

| | | | |
|---|---|---|---|
| 63-31908 | 2/1988 | Japan | 312/35 |
| 63-82203 | 3/1988 | Japan | 312/35 |
| 1-271309 | 10/1989 | Japan | 312/306 |
| 318008 | 2/1991 | Japan . | |
| 3284505 | 12/1991 | Japan . | |
| 4292307 | 10/1992 | Japan . | |
| 4313504 | 11/1992 | Japan . | |
| 4341404 | 11/1992 | Japan . | |
| 630360 | 4/1994 | Japan . | |
| 6219514 | 8/1994 | Japan . | |
| 721922 | 4/1995 | Japan . | |
| 7125803 | 5/1995 | Japan . | |

OTHER PUBLICATIONS

Kardex Industriever 8000 brochure; Kardex Systems, Inc.

*Primary Examiner*—Janet M. Wilkens
*Attorney, Agent, or Firm*—Webb Ziesenheim Logdson Orkin & Hanson, P.C.

[57] ABSTRACT

A storage apparatus that includes a storage shelf having a plurality of horizontally and vertically arranged storage sections for storage of articles and a moving body for taking articles in and out of the storage shelf. Conventionally, since an article carrying in and out section for taking articles in and out of such storage apparatus is divided into working sections having substantially the same width as that of storage sections, a space for work is small and a work is made difficult and inefficient when the moving body is used to take articles out of the storage sections or articles are placed on the working sections. Therefore, a working space, which protrudes beyond the article carrying in and out section and is free of partitions is provided. With such arrangement, however, there is a problem that a storage apparatus is extended in a lengthwise direction. An article carrying in and out section of the storage apparatus is formed by an opening which is opened across a plurality of widths of the storage sections between front and rear surfaces of the storage shelf provided with the article carrying in and out section, so that a large working space can be provided which is free of any portion protruding beyond the storage apparatus.

24 Claims, 21 Drawing Sheets

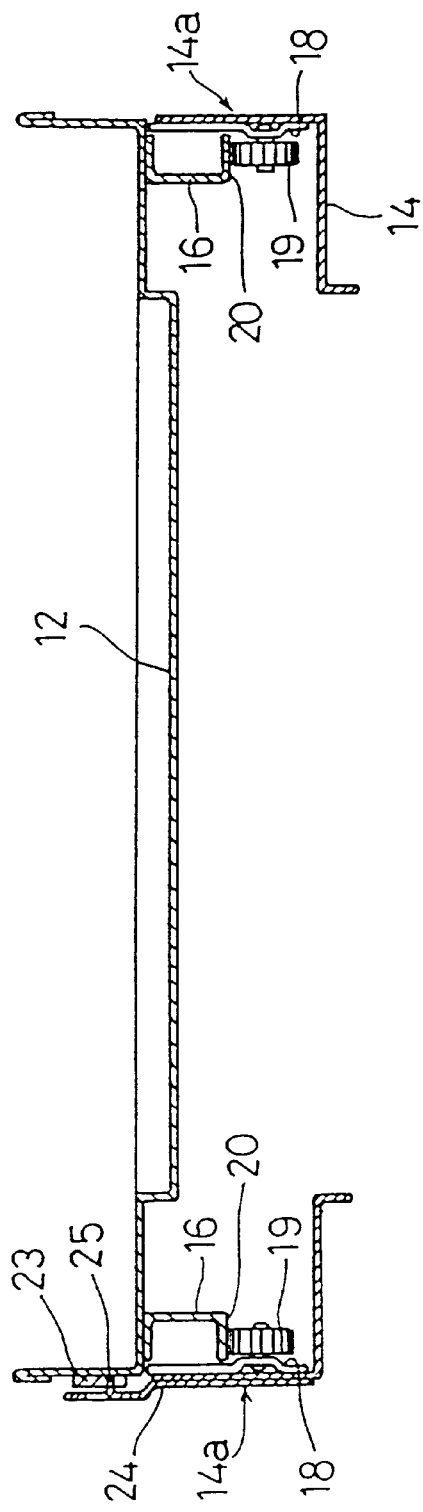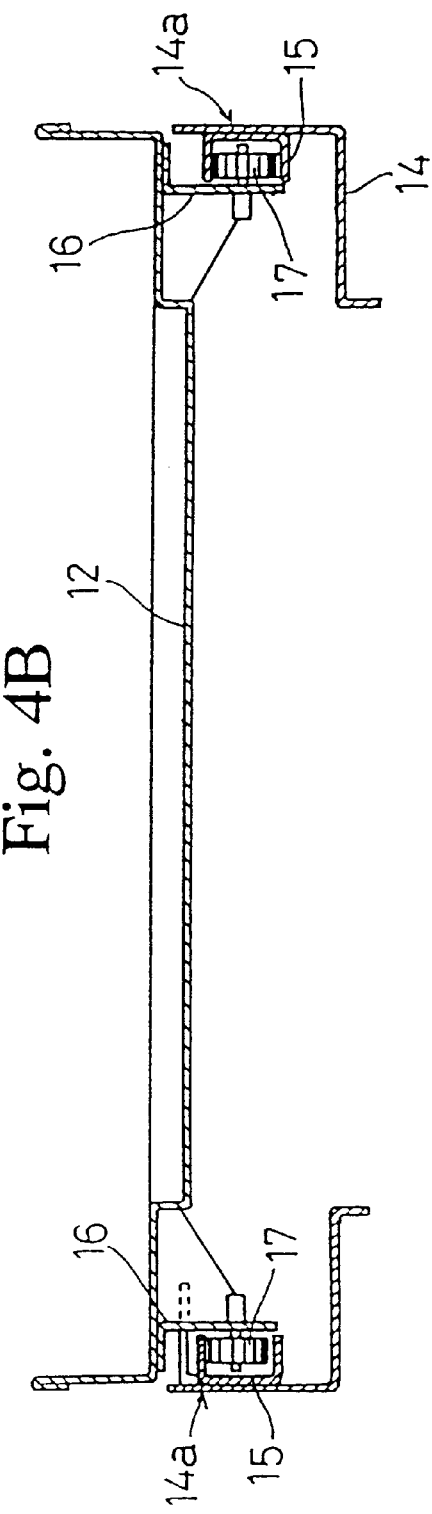

STORAGE APPARATUS

TECHNICAL FIELD

The present invention relates to a storage apparatus including storage sections for storing articles and a moving body for carrying in and out the articles. More particularly, the present invention relates to a storage apparatus including a storage shelf having a plurality of storage sections arranged vertically and horizontally for storing the articles, an article carrying in and out section having a working section for carrying in and out the articles being provided at a portion of the storage shelf, a moving body being provided for conveying the articles between the working section and the storage section, the moving body including an article transfer device for transferring the articles between the working section and the respective storage section.

BACKGROUND ART

As an example of storage apparatus of the above type, there is known a storage apparatus including two storage shelves disposed with a front-rear distance therebetween, each storage shelf comprised of a plurality vertically stacked horizontal arrays formed by disposing storage sections for storing e.g. containers side by side in the horizontal direction. A moving body is provided for conveying an article over the distance between the pair of storage shelves.

This type of storage apparatus may be formed compact as a whole, while allowing automatic carriage of an article introduced to an article carrying in and out section into a designated one of the plurality of storage sections and conversely carrying out the article from the storage section to the article carrying in and out section.

A storage apparatus of this type is disclosed in e.g. Japanese laid-open patent gazette Hei. 4-341404. In the case of the storage apparatus disclosed in this gazette, at the front face of the storage shelf, posts are arranged with a same inter-distance as the width of the storage section. Because of the presence of the posts, working spaces at the respective working sections in the article carrying in and out section are partitioned from each other. That is to say, the width of each working section was limited to be same as the width of the storage section.

Accordingly, when a worker takes out an article introduced into a certain working section of the article carrying in and out section from the storage section or when the worker places an article to be carried in into a certain working section of the article carrying in and out section, the space reserved for the work is limited, thus making the work difficult. Further, with this type of storage apparatus, in general, different kinds of articles are stored in different storage sections. Thus, when two kinds of articles are needed at one time for example, it sometimes happens that one kind of article is conveyed to one working section by the moving body and another kind of article is conveyed to another working section. And, when the two kinds of articles located at the different working sections are to be carried out, the operation is very inefficient if the working sections are partitioned from each other.

Then, as a construction for overcoming the above-described inconvenience, it is conceivable to cause a working table (a drive conveyer 9 in the case of the above gazette) of the working section to protrude to the outside of the apparatus, in order to secure a space for working. However, this results in enlargement of the front-rear width of the apparatus thus enlarging the entire apparatus disadvantageously.

DISCLOSURE OF THE INVENTION

The object of the present invention is to provide a storage apparatus which entire apparatus may be formed compact yet which can allow efficient carrying in and out operations of articles. For accomplishing this object, a storage apparatus, according to the present invention, comprises: first and second storage shelves disposed with a distance therebetween in a front-rear direction as a first direction, each storage shelf including a predetermined number of horizontal arrays disposed vertically, each horizontal array having a plurality of storage units for storing articles which units are arranged side by side in a lateral direction as a second direction normal to the first direction, each storage shelf having front and rear faces extending normal to the first direction; a lift table disposed within the space between the pair of storage shelves and movable along the vertical direction of the storage shelves; lift operating means for lifting up and down the lift table; a moving body mounted on the lift table to be movable in the second direction; lateral movement operating means for allowing movement of the moving body relative to the lift table; an article transfer device mounted on the moving body for moving the article between the storage section and the moving body and between the working section and the moving body; and an article carrying in and out section formed between the front and rear faces of the first storage shelf, the article carrying in and out section being provided as an opening opened through widths of the plurality of storage units.

Accordingly, in the case of the conventional storage apparatus, in order to render the width of the article carrying in and out section larger than the storage unit, it was necessary to cause the working table to protrude in the front direction of the storage apparatus. Whereas, in the case of the storage apparatus according to the present invention, it has become possible to provide the article carrying in and out section with the opened space free from such obstacles as frames, without having to extend the working table. Consequently, it has become possible to provide a storage apparatus which entire apparatus may be formed compact yet which can allow efficient carrying in and out operations of articles.

BRIEF DESCRIPTION OF THE DRAWINGS

FIGS. 4A and 4B are sections taken along A-A' and B-B' in FIG. 3, respectively.

BEST MODE FOR CARRYING OUT THE INVENTION

Next, embodiments will be described with reference to the accompanying drawings.

Figure 1:
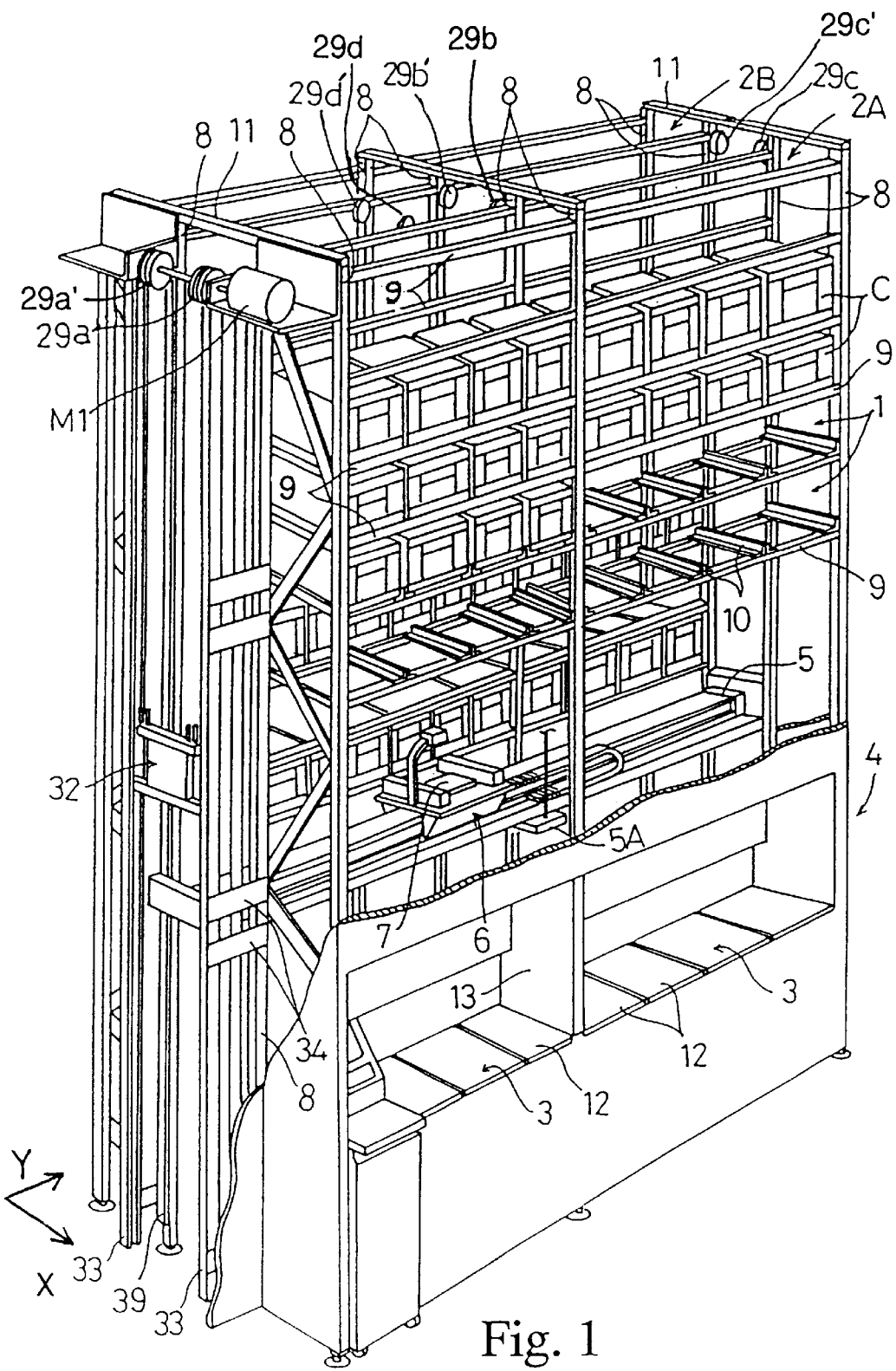
FIG. 1 shows a storage apparatus according to the present invention, the figure being a partially cutaway perspective view to facilitate understanding of the construction of this storage apparatus.

FIG. 1 shows an entire storage apparatus according to the present invention. In this embodiment, a container C as an example of article may be stored at one of a plurality of storage sections provided on a storage shelf and a container C stored on a predetermined storage shelf may be taken out. Incidentally, the containers C may accommodate e.g. small items according to their kinds. Here, the storage section 1 is defined as a minimum unit of storage space of the storage apparatus. Accordingly, the storage section 1 may be referred to also as a storage unit.

In this specification, a direction denoted with X in FIG. 1 will be referred to as a front direction, and the opposite direction will be referred to as a rear direction. Also, a direction denoted with Y will be referred to as a right direction and the opposite direction will be referred to as a left direction, respectively. Accordingly, a front-rear direction comprises the direction of an axis extending along the arrow X, and a lateral, or horizontal, direction comprises the direction of an axis extending along the arrow Y.

This storage apparatus includes a pair of storage shelves 2A, 2B with a predetermined distance therebetween in the first direction, each shelf including a plurality of storage sections 1 for storing the articles. In other words, a horizontal array is formed by the plurality of horizontally disposed storage sections 1 and a plurality of horizontal arrays are vertically stacked one above another, thereby to constitute one storage shelf. By utilizing a lower region of the storage shelf 2A disposed on the front side, there is provided an article carrying in and out section 4 including a plurality of working sections 3 for carrying in and out the articles, the working sections 3 being disposed side by side in the lateral direction.

In the middle of the front-rear direction of each storage shelf 2A, 2B, there is provided a lift table 5 having a same or substantially same width as the shelf, with the lift table being liftable along substantially the entire vertical height of the storage shelves 2A, 2B. The lift table 5 mounts a moving body 6 which is movable along substantially the entire lateral extension of the lift table 5. Further, this moving body 6 includes an article transfer device 7 for transferring the container C between the working section 3 of the article carrying in and out section and the moving body 6 and between the storage sections 1 of the respective storage shelves 2A, 2B and the moving body 6.

As shown in FIG. 1, on the front face of the storage shelf 2A, there are provided three posts 8 at the opposed ends and the middle therebetween. On the rear face of the storage shelf 2A too, there are provided three posts 8 at the opposed ends and the middle therebetween. Accordingly, for the storage shelf 2A, there are provided a total of six posts 8. For the other storage shelf 2B, at the same positions corresponding to those of the storage shelf 2A, there are provided a total six of posts 8. The number of the posts may be more than 3, e.g. four or five, on the front and rear face of the storage shelf 2A, 2B, respectively.

The three posts 8 disposed on the front face of the storage shelf 2A and the three posts 8 located on the rear side, respectively, are interconnected by a plurality of lateral frames 9 which are vertically arranged with a predetermined vertical distance therebetween. Similarly, a plurality of lateral frames 9 are provided also for the storage shelf 2B. And, retaining members 10 are provided between each lateral frame 9 provided on the front face of the respective storage shelf 2A, 2B and another lateral frame 9 on the same level provided on the rear face. As may be apparent from FIG. 1, these retaining members 10 are fixed to the lateral frames 9 with a predetermined distance therebetween for allowing mounting and storage of the containers C.

Figure 2:
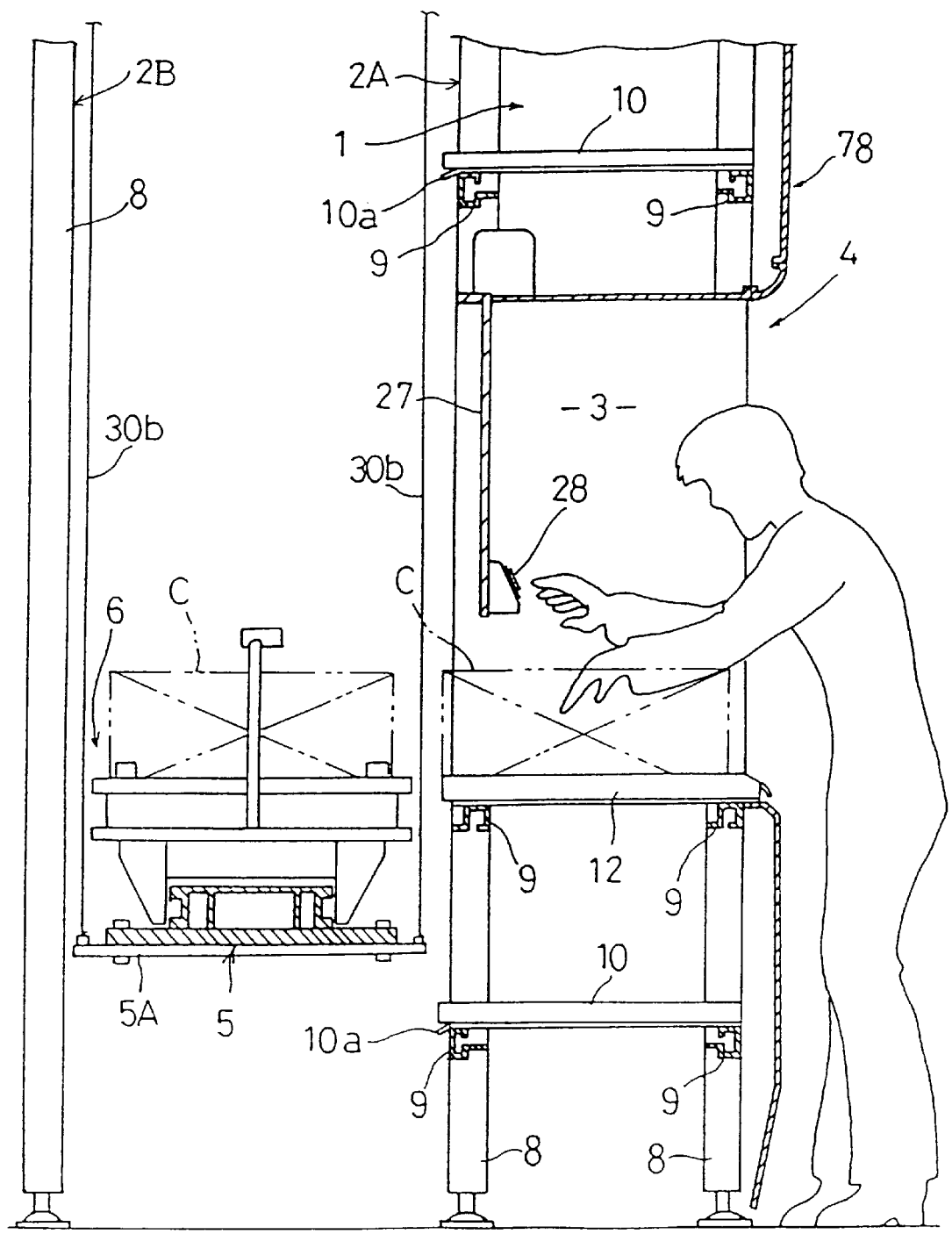
FIG. 2 is a side view showing a cross section of a working section.

The retaining members 10 have substantially L-shaped cross section so as to support the lateral opposed ends of the container C and also to restrict lateral displacement thereof. Namely, a pair of opposed L-shaped retaining members form a part of the storage section. Further, as shown in FIG. 2, this retaining member 10 includes, at a lower face thereof on the side of the lift table, a guide portion 10a curved obliquely downwards. Then, the bottom of the container C is guided by this guide portion 10a, so that the container C may be smoothly transferred. Accordingly, a pair of front and rear lateral frames 9 and the plurality of retaining members 10 extending therebetween together constitute the horizontal array of the storage sections 1. And, each of the storage shelves 2A, 2B includes a predetermined number of these horizontal arrays. Further, the front and rear storage shelves 2A, 2B are interconnected with each other, at the tops of the respective posts 8, with a predetermined distance therebetween by means of lateral rods 11.

The article carrying in and out section 4 is provided, at the lower region of the front-side storage shelf 2A, by utilizing the area corresponding to a plurality of vertically stacked storage sections 1 over the entire lateral widths thereof. And, the working sections 3 for carrying in and out the containers C are disposed side by side in the lateral direction. At each working section 3, in the level corresponding substantially to the waist of the worker, there is provided a working table 12 on which the container C is to be placed. Further, as shown in FIG. 2, upwardly of this working table 12, there is reserved a working space for allowing carrying in and out operations. In the respective working space, a plurality of working areas corresponding to the widths of the plurality of storage sections 1 extend continuously and are opened so as to allow the carrying in and out operations of the containers C to be carried out easily in an open wide space without being interfered with by any other object. Incidentally, at the center of the article carrying in and out section 4 (the position corresponding to the center post 8), there is provided a partition wall 13.

Figure 3:
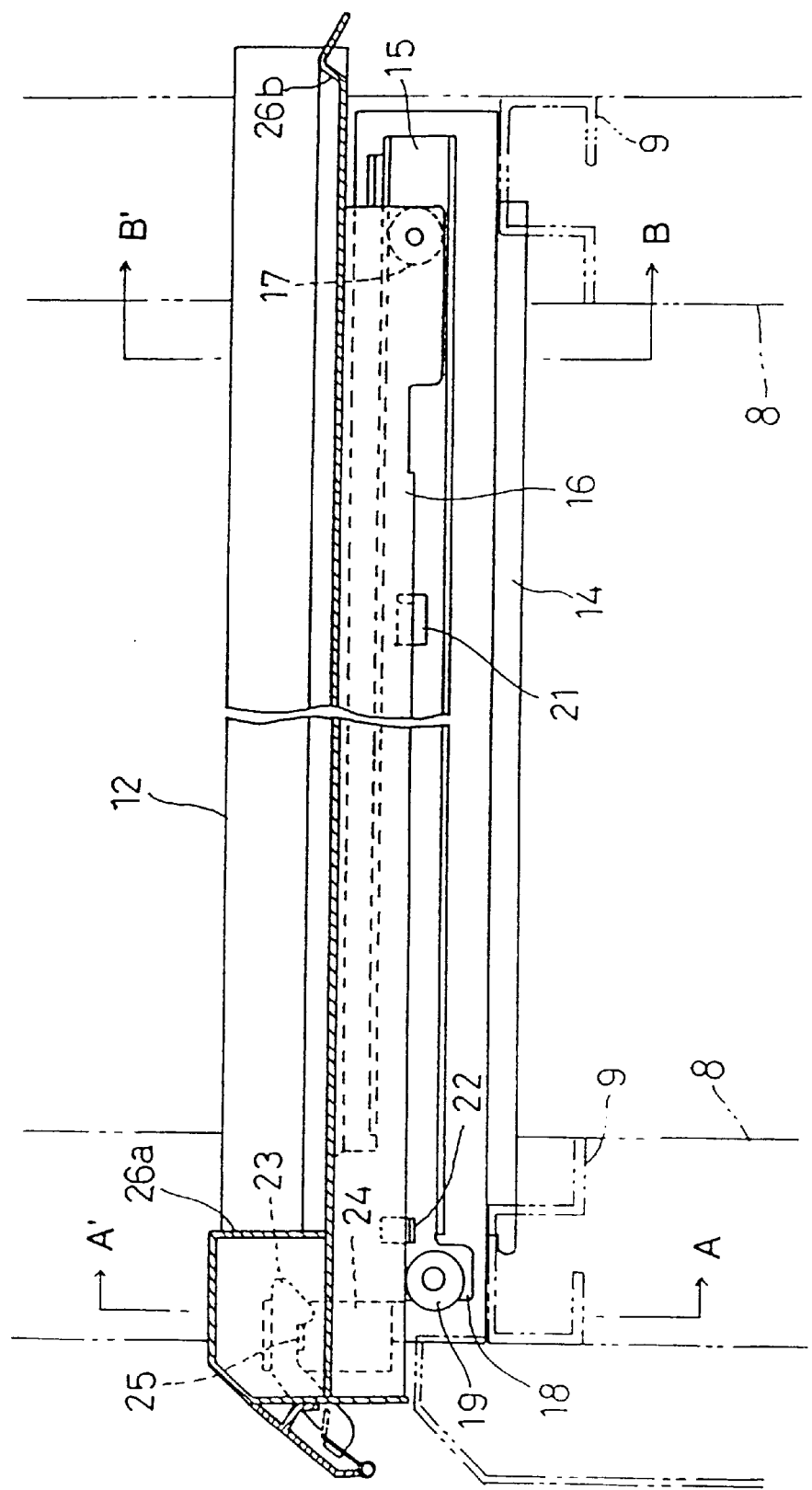
FIG. 3 is a side view showing a cross section of a working table support portion.

Each working table 12 is movable back and forth between a transferring position as a first position where the article transfer device 7 transfers the container C and a carrying in and out position as a second position projecting more outwardly than the transfer position. That is, as shown in FIGS. 3 and 4, at opposed vertical faces 14a, 14a of a fixed table 14 fixed to and across the front and rear lateral frames 9, there are attached guide rails 15 having an angularly C-shaped cross section. And, on the rear side of support members 16 attached to the opposed sides of the bottom face of the working table 12, there are supported moving guide rollers 17 which engage with and are guided by the respective guide rails 15.

Further, to support portions 18 extending integrally from the guide rails 15 on the front side, there are supported stationary guide rollers 19, on which engaging guide pieces 20 extending from the respective support members 16 movable with the working table 12 are mounted and slidably guided thereon. And, a contact portion 21 disposed at an intermediate portion of the support member 16 comes into contact with a fixed-side contact restricting portion 22, thereby to restrict any further outward projection, thus setting the carrying in and out position.

Further, when the working table 12 is retracted to the carrying in and out position, a retaining hook 23 provided on the working table 12 automatically engages, by its own weight, with a lock member 25 supported by a bracket 24 to one lateral outer face of the fixed table 14, whereby the working table 12 is locked in this position.

At a front end portion of the container mounting face of the working table 12, there is provided a contact portion 26a against which the container C when transferred by the article transfer device 7 comes into abutment at a predetermined transfer position so as to be prevented from being ejected outward, and at a rear end portion thereof, there are provided a guide face for allowing introduction of the container C and an engaging portion 26b for preventing ejection to the outside.

As shown in FIG. 2, at an upper position on an inner depth side of the container mounting space of the working section 3, there is provided a partition wall 27, which partitions between the working space and the lifting space of the lift table 5, thereby to assure the safety of work. Also, at a lower position of this partition wall 27, in correspondence with each working section 3, there is provided a work completion switch 28 which is to be operated for allowing subsequent operation after completion of the article carrying in and out operation, as will be described later.

Next, with reference to FIGS. 1, 5A and 5B, lift operating means for the lift table 5 will be described.

As shown in FIG. 1, at upper positions on opposed side ends of this lift table 5, there are provided four guide drums 29a, 29a', 29c, 29c'. The guide drums 29c, 29c' are attached to the posts 8. Further, at the lateral center of the storage shelves 2A, 2B and at upper end regions of the pair of posts 8 opposed to the lift table 5, there are provided a pair of guide drums 29b, 29b'. Moreover, between the paired guide drums 29a, 29a' and the paired guide drums 29c, 29c', and on the side closer to the paired guide drums 29a, 29a', there are provided auxiliary guide drums 29d, 29d'. These auxiliary guide drums 29d, 29d' are provided at the upper ends of the storage shelves 2A, 2B and attached to the pair of lateral frames 9 opposed to the lift table 5. Each of these total 8 units of guide drums, as shown in FIG. 5B, comprises a plurality of pulleys attached side by side, and includes, in an outer periphery thereof on which connecting wires are wound, recesses O so as to provide an increased sliding face with the connecting wires.

Figure 5A:
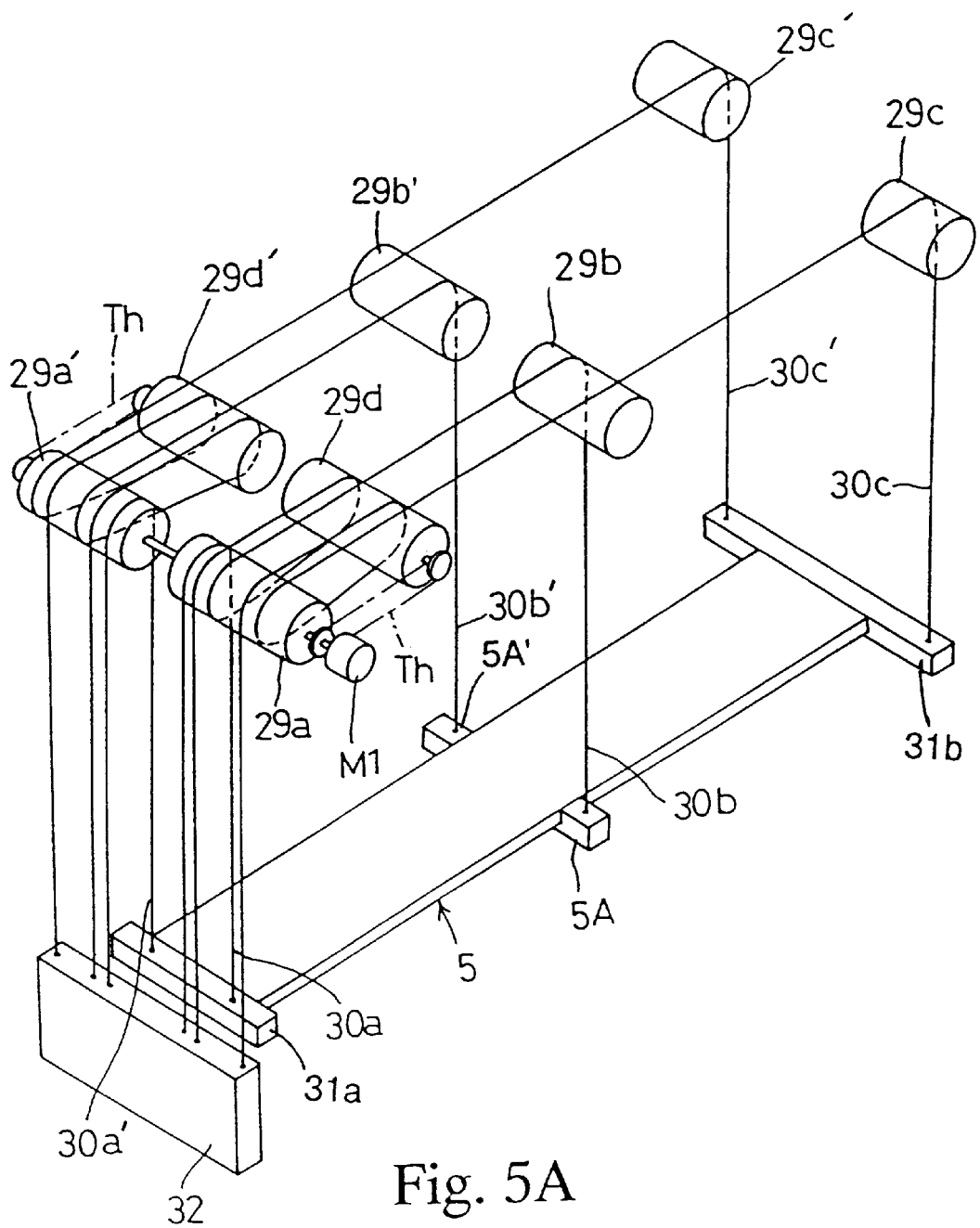
FIG. 5A is a perspective view showing a support construction for a lift table.
Figure 5B:
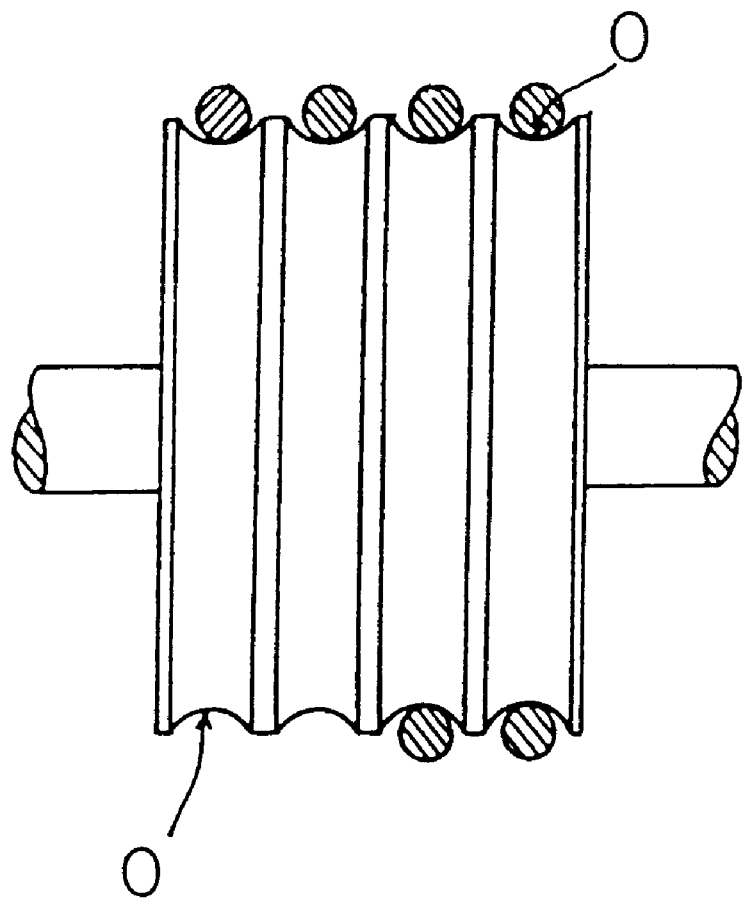
FIG. 5B is a view showing configuration of guide members.
Figure 6:
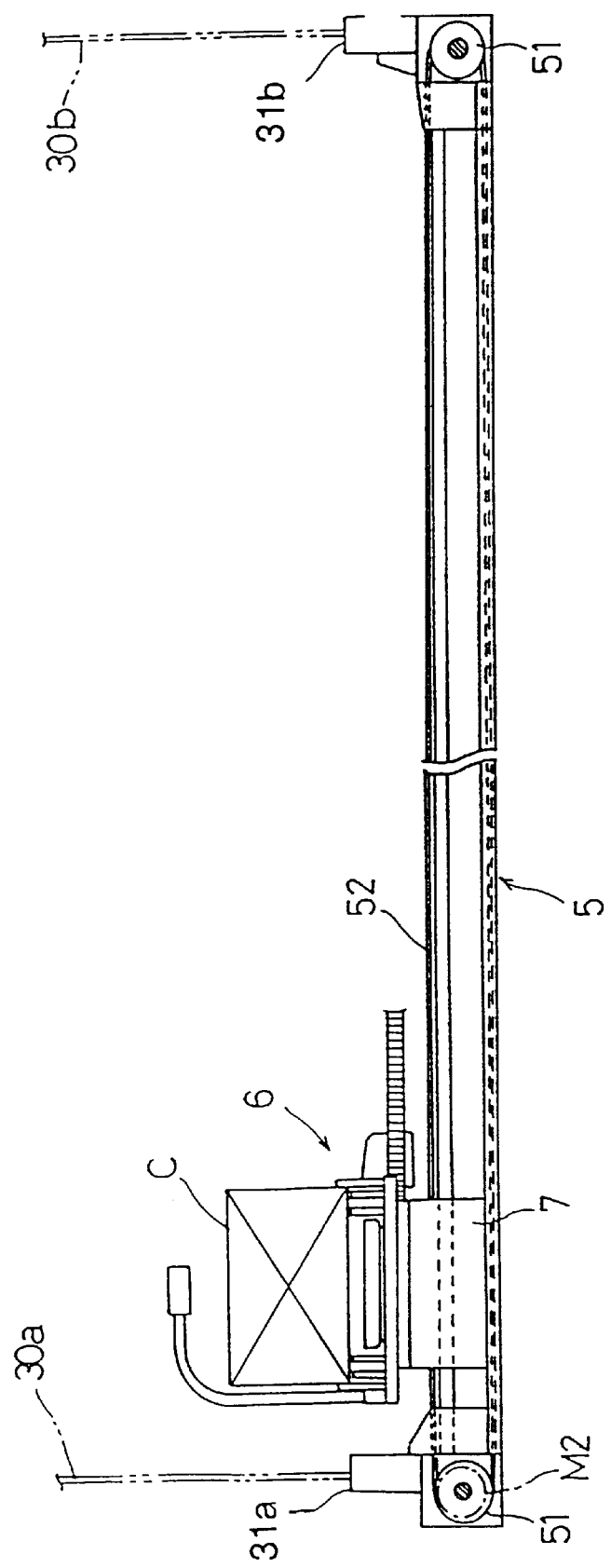
FIG. 6 is a front view of the lift table.

As shown in FIG. 5A, the lift table 5 is supported by means of total six of connecting wires 30a, 30a', 30b, 30b', 30c, 30c'. One terminal end of each of these six wires is connected to a balance weight 32 and the other end thereof is connected with a pair of support members 31a, 31b fixed to the right and left sides of the lift table 5 and a pair of support 5A, 5A' fixed to the central portion of the lift table 5. Each support member 31a, 31b has a rectangular shape and is attached, with the front-rear orientation, to the opposed side ends of the lift table 5.

As shown in FIG. 5A, the connecting wires 30a, 30a' are connected to the support member 31a disposed on the left end of the lift table 5, with a front-rear distance therebetween. And, the wires extend upwards from this support member 31a to come into contact with the upper half portions of the outer peripheries of the guide drums 29a, 29a' and extend downward to be connected with the balance weight 32.

The connecting wires 30c, 30c' extend upward from the support member 31b disposed at the right end of the lift table 5 to come into contact with right upper quarter portions of the outer peripheries of the guide drums 29c, 29c' and then extend horizontally to the left to come into contact with the left half portions of the outer peripheries of the guide drums 29a, 29a', extend horizontally to the right to come into contact with the right half portions of the outer peripheries of the auxiliary guide drums 29d, 29d'. Thereafter, the wires again extend horizontally to the left to come into contact with the left upper quarter portions of the outer peripheries of the guide drums 29a, 29a' and then extend downward to be connected with the balance weight 32.

The connecting wires 30b, 30b' are connected respectively with the pair of support arms 5A, 5A' provided at the lateral center of the lift table 5. These paired support arms 5A, 5A' extend in the front-rear direction to support the connecting wires 30b, 30b' so as not to prevent the lateral displacement of the moving body 6. Further, as viewed in the front-rear direction, the support arms 5A, 5A' are disposed at a position overlapping with the post 8 disposed at the lateral center of the storage shelves 2A, 2B.

The connecting wires 30b, 30b' extend respectively upward from the support arms 5A, 5A' to come into contact with the right upper quarter portions of the outer peripheries of the guide drums 29b, 29b' and then extend horizontally to the left to come into contact with the left half portions of the outer peripheries of the guide drums 29a, 29a' and extend horizontally to the right to come into contact with the right half portions of the outer peripheries of the auxiliary guide drums 29d, 29d' and again extend horizontally to the left to come into contact with the left upper quarter portions of the outer peripheries of the guide drums 29a, 29a' and extend downward to be connected with the balance weight 32.

Accordingly, the connecting wires 30b, 30c are wound about the guide members 29a, 29d so that the guide members 29a and 29d are located within loops formed by the connecting wires 30b, 30c.

The balance weight 32 is moved up and down along a weight lift passage formed on the left side of the lift passage of the lift table 5. As the two guide drums 29a, 29a' on the left side are driven forwardly or reversely by means of a single electric motor M1 (an example of lift drive means), the respective connecting wires 30a, 30a', 30b, 30b', 30c, 30c' are moved forwardly or rearwardly in the longitudinal direction, thereby to lift up and down the lift table 5.

The connecting wires are wound about the respective guide drums 29a, 29a', 29b, 29b', 29c, 29c' and the auxiliary guide drums 29d, 29d' in the manners described above. In this, sufficient winding angles are secured so as to allow the drive force of the electric motor M1 to be reliably transmitted to the respective connecting wires 30a, 30a', 30b, 30b', 30c, 30c'. Also, in comparison with a case where the wires are wound one time about the driving side guide drums 29a, 29a', provision is made to minimize the possibility of twisting of the connecting wires 30b, 30b', 30c, 30c'. More particularly, auxiliary guide members 29d, 29d' are provided in the storage apparatus, and e.g. the connecting wire 30b forms a loop between the guide member 29a and the auxiliary guide member 29d. In other words, the guide member 29a and the auxiliary guide member 29d are located within the loop formed by the connecting wire 30b. With this, the connecting wire 30b comes into contact with the guide member 29a by which the wire is driven, at angle of 270 degrees, thereby to reduce the possibility of slip of the connecting wire 30b relative to the guide member 29a. Moreover, without the auxiliary guide member 29d, that is, if the connecting wire 30b formed a loop between the guide members 29a and 29b, this would result in elongation of the connecting wire 30b, so that there might occur change in the stop position of the lift table 5 if the wire 30b is increased in length in association with the lifting operation. If this problem occurs in the connecting wire 30b, there is also the possibility of inclination of the lift member 5. In this manner, the auxiliary guide members 29d, 29d' serve to minimize the entire length of the connecting wire while assuring a large winding angle of the connecting wire relative to the drive guide member 29a.

Further, in this embodiment, the lift table 5 is supported by the total six connecting wires as described above. As the lift table 5 has a rectangular shape elongate in the lateral direction, it is conceivable to support this rectangular member with only four connecting wires at the four corners thereof. However, there is the possibility of the lift table 5 being warped at the lateral central portion due to e.g. the weight of the lift table 5 per se or the load of the articles. Thus, by supporting the lift table 5 with the two additional connecting wires at the lateral central portion or in the vicinity thereof, the possibility of warping of the lift table 5 may be reduced. With this reduced possibility of warping of the lift table 5, the durability of the lift table 5 is improved and there will be formed no vertical gap between the lift table and the storage sections, whereby the articles may be transferred smoothly between the lift table and the storage sections.

Incidentally, in this embodiment, the auxiliary guide member 29d too is driven via a drive chain Th as a synchronized drive means. Instead, the auxiliary guide member 29d may be supported to be freely rotatable without being driven.

Figure 8:
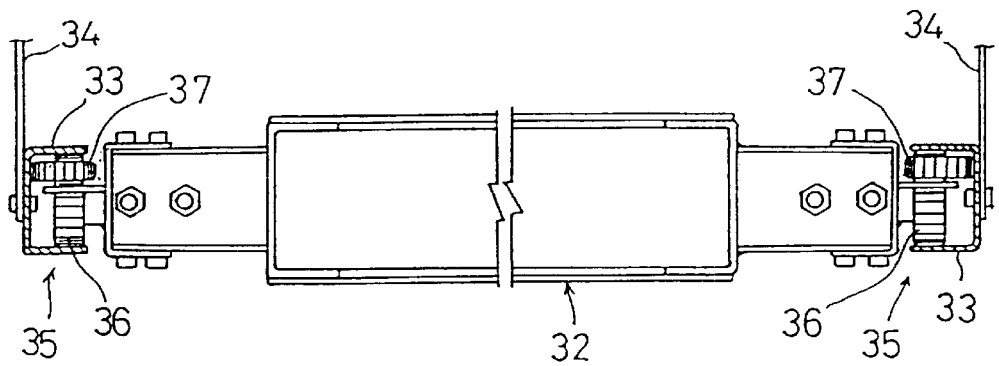
FIG. 8 is a plan view of a balance weight as being viewed from the above.
Figure 9:
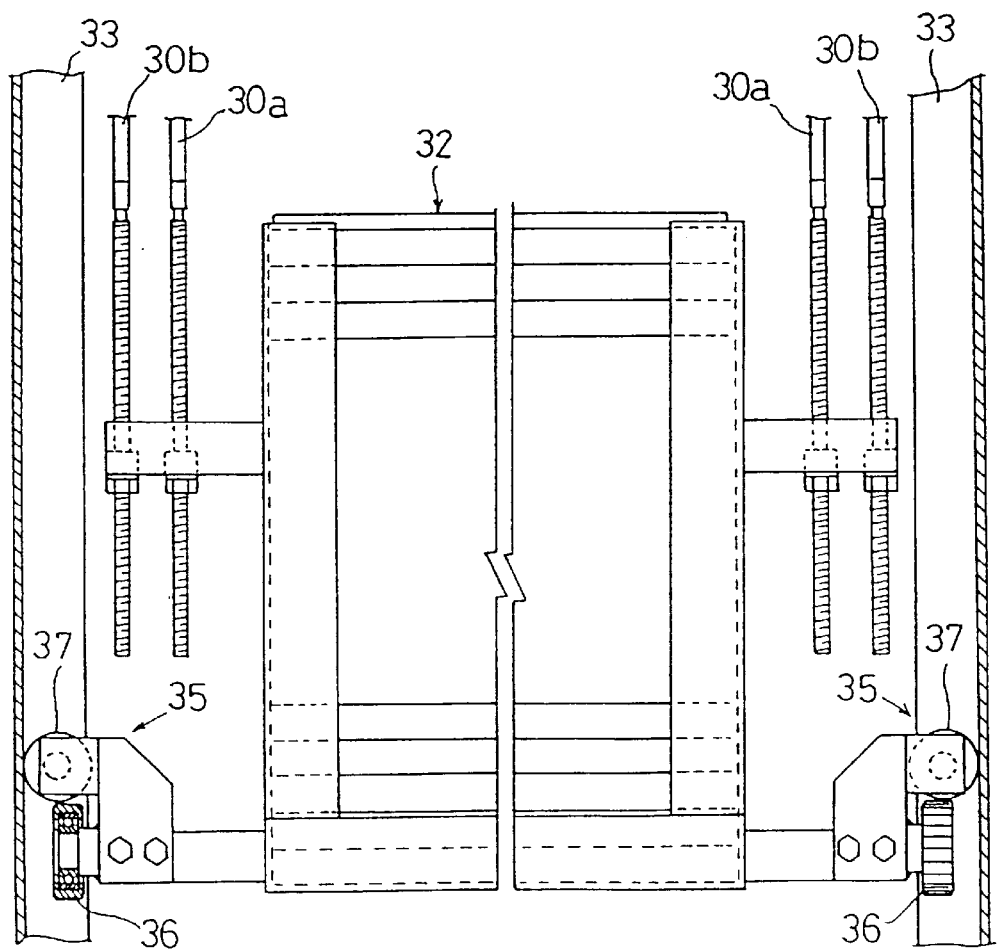
FIG. 9 is a side view of the balance weight.

FIG. 8 shows the balance weight 32 and its support mechanism disposed on the left side of the storage apparatus, as viewed from the above. A pair of front and rear guide rails 33 for vertically guiding the balance weight 32 are shown in FIGS. 8 and 9. Each guide rail 33 has a cross section having a shape of a half of a rectangle, and is supported via a plurality of brackets 34 to the posts 8 of the front and rear storage shelves 2A, 2B. A guided portion 35 on the side of the balance weight is constructed to be smoothly liftable while the guide portion has its lateral movement checked by a roller 36 rotatable about a front-rear axis while coming into slidable contact with the inner face of the guide rail 33 and has its front-rear movement checked by a roller 37 rotatable about a lateral axis.

With the rationalized construction of the suspension type lift mechanism described above, the mechanism may be formed compact with minimized outward projection while bypassing the lift passage of the lift table 5.

Figure 7:
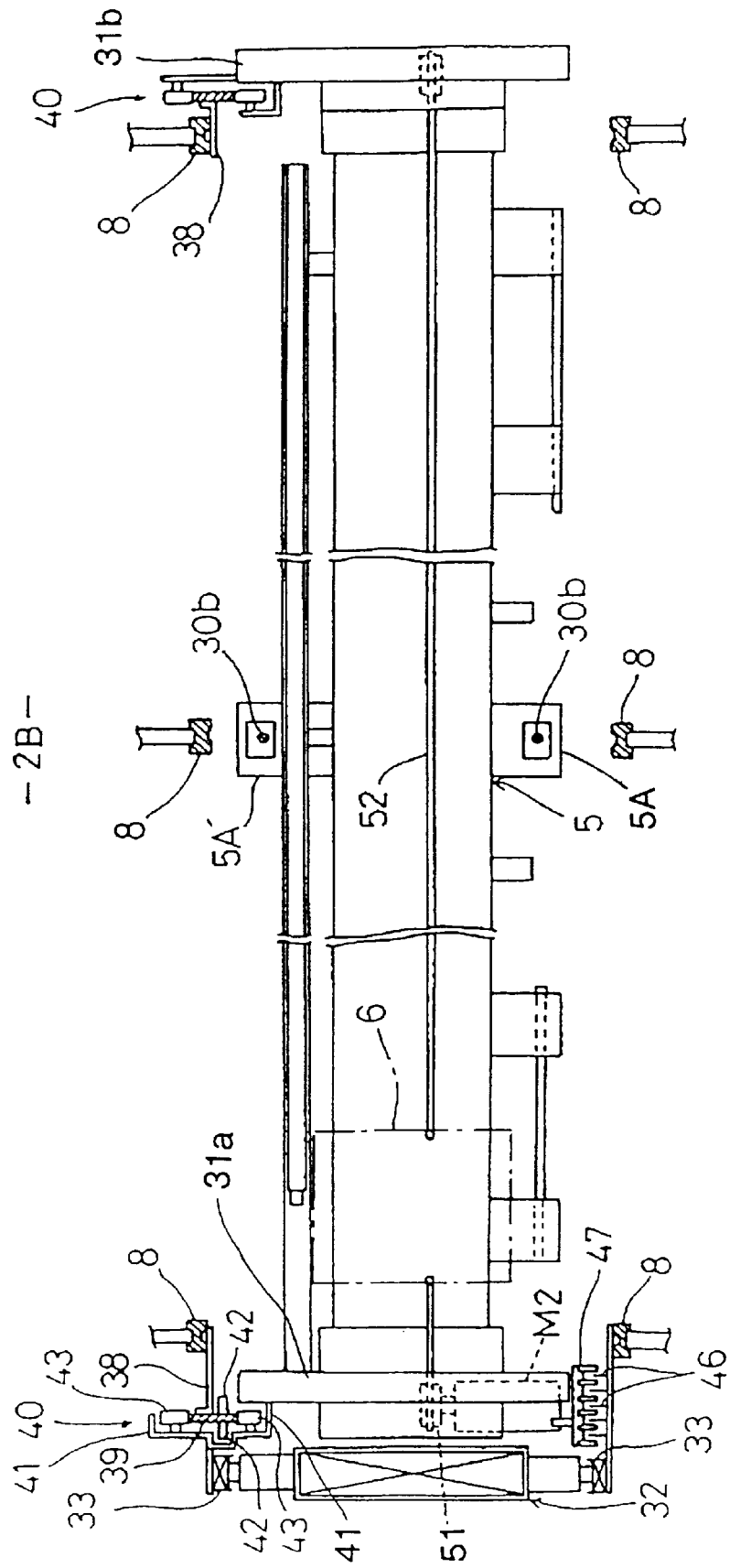
FIG. 7 is a plan view of the lift table as being viewed from the above.

FIG. 7 shows the lift table 5 located between the storage shelves 2A, 2B as viewed from the above. As shown in FIG. 7, there is provided a lift guide 39 (an example of lift guide mechanism) comprised of angular bar elements attached via the plurality of brackets 38 to the respective posts 8 located at the opposed lateral ends of the rear side storage shelf 2B. This lift guide 39 liftably guides a guided portion 40 of the lift table 5 while checking its horizontal movement.

Figure 10:
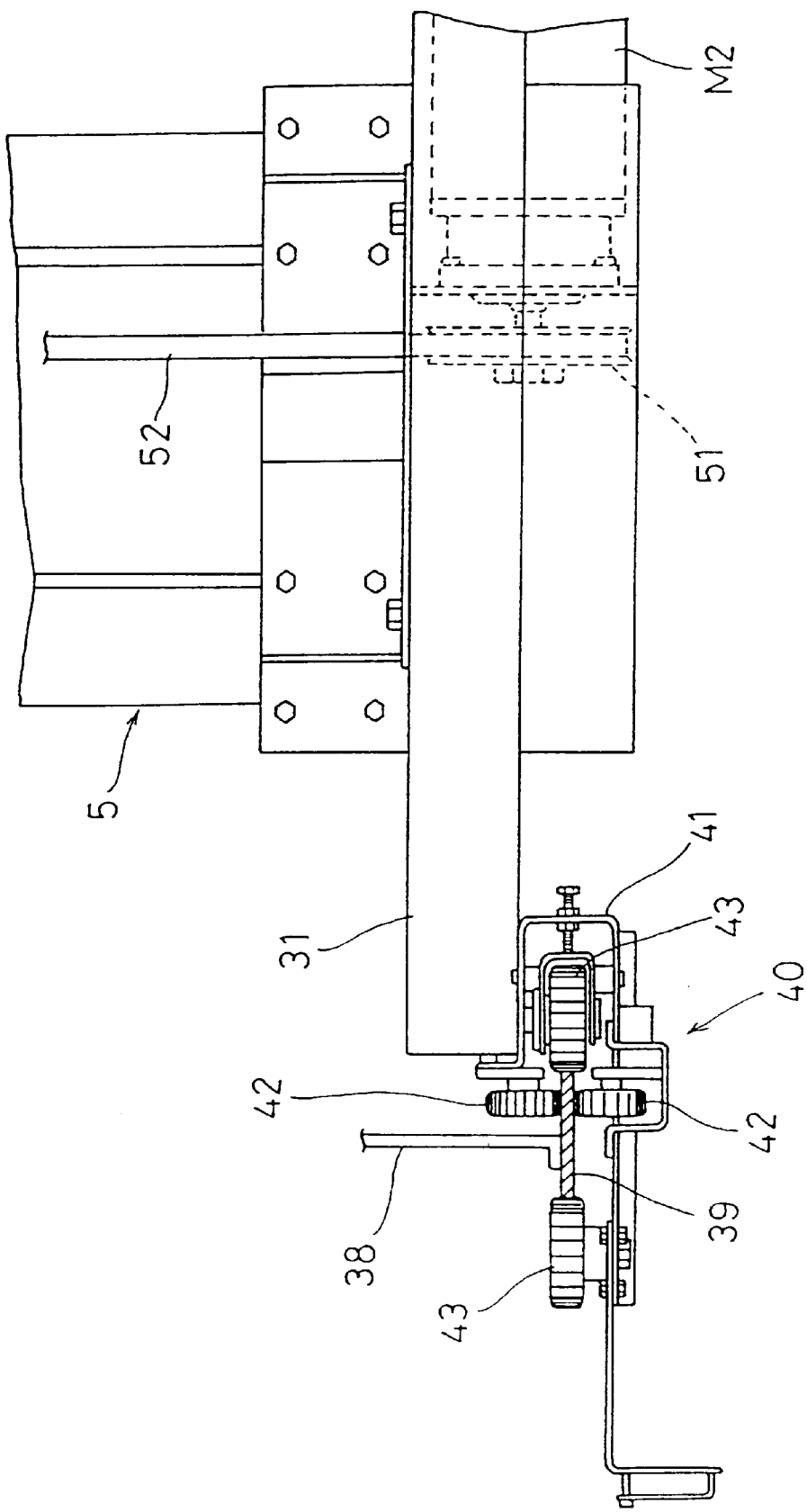
FIG. 10 shows a guide construction of the lift table, the figure being a plan view of the guide construction as seen from the above.
Figure 11:
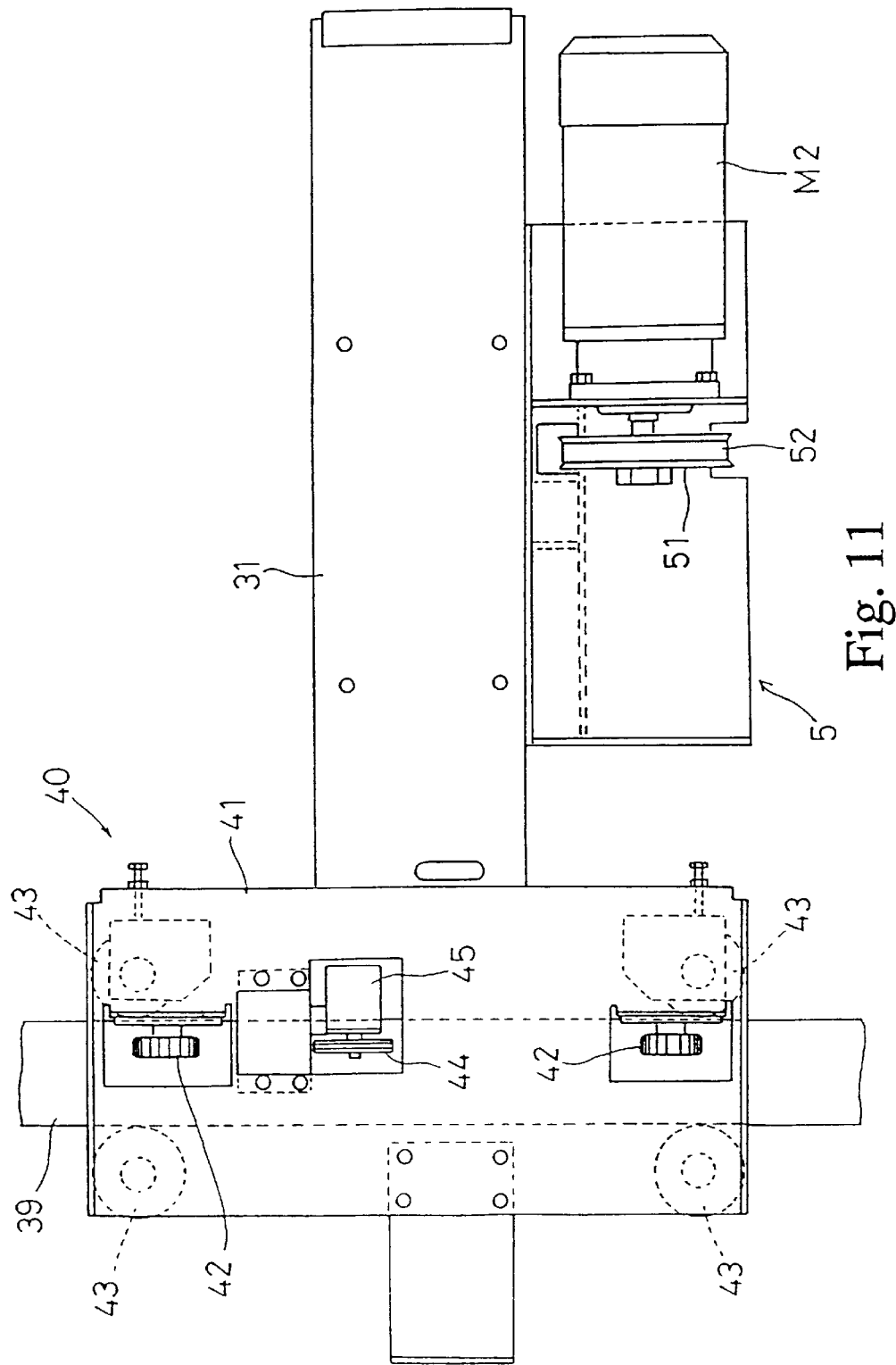
FIG. 11 is a side view of the lift table.
Figure 12:
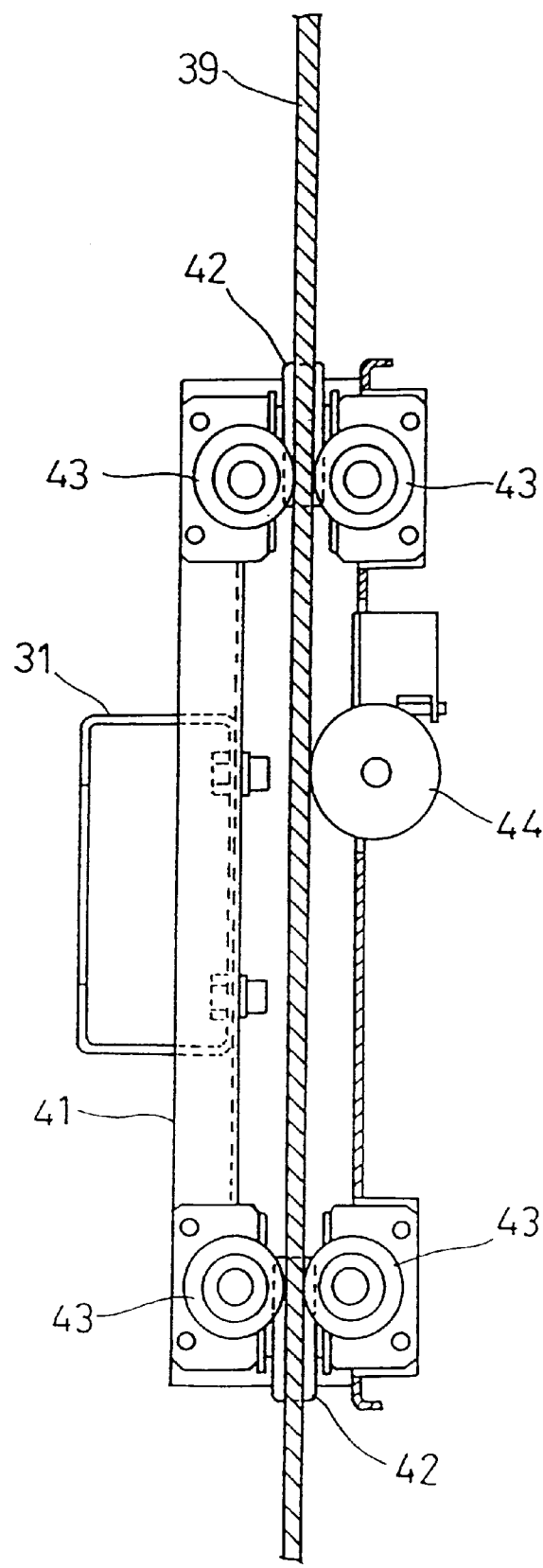
FIG. 12 is a front view of the lift table as being viewed forwardly of the storage apparatus.

At the guided portion 40 of the lift table 5, as shown in FIGS. 10, 11 and 12, at rear end of each support member 31a, 31b, there is fixedly attached a support bracket 41. This support bracket 41 carries, respectively at two upper and lower positions, a pair of rollers 42 rotatable about a front-rear axis. These two pairs of rollers 42 bind the opposed side faces of the lift guide 39 to prevent relative lateral displacement of the lift table 5. Further, the support bracket 41 rotatably supports two pairs of rollers 43 with a vertical distance therebetween. These rollers 43 bind and support the front-rear faces of the lift guide 39 at the two upper and lower positions, thereby to prevent the front-rear relative movement of the lift table 5. Accordingly, with the two pairs of rollers 42 and the two pairs of rollers 43, a horizontal movement of the lift table 5 is prevented.

Incidentally, as shown in FIG. 11, the support bracket 41 mounts a rotary encoder 45 for detecting an amount of lift based on a rotational amount of the roller 44 sliding and rolling against the lift guide 39 in association with a lifting movement of the lift table 5. Further, as shown in FIG. 7, on the side of the support member 31 opposite to the position of the support bracket 41, there is provided a transmission type photoelectric sensor 47 for determining the lift stop position of the lift table 5 as the sensor is shielded by shielding plates 46 disposed at appropriate positions.

Next, the lateral movement operating construction for the moving body 6 will be described. In the following description of the moving body 6 too, the afore-mentioned definitions of the directions, i.e. the definitions of the front-rear direction and the right-left direction will be employed.

Figure 13:
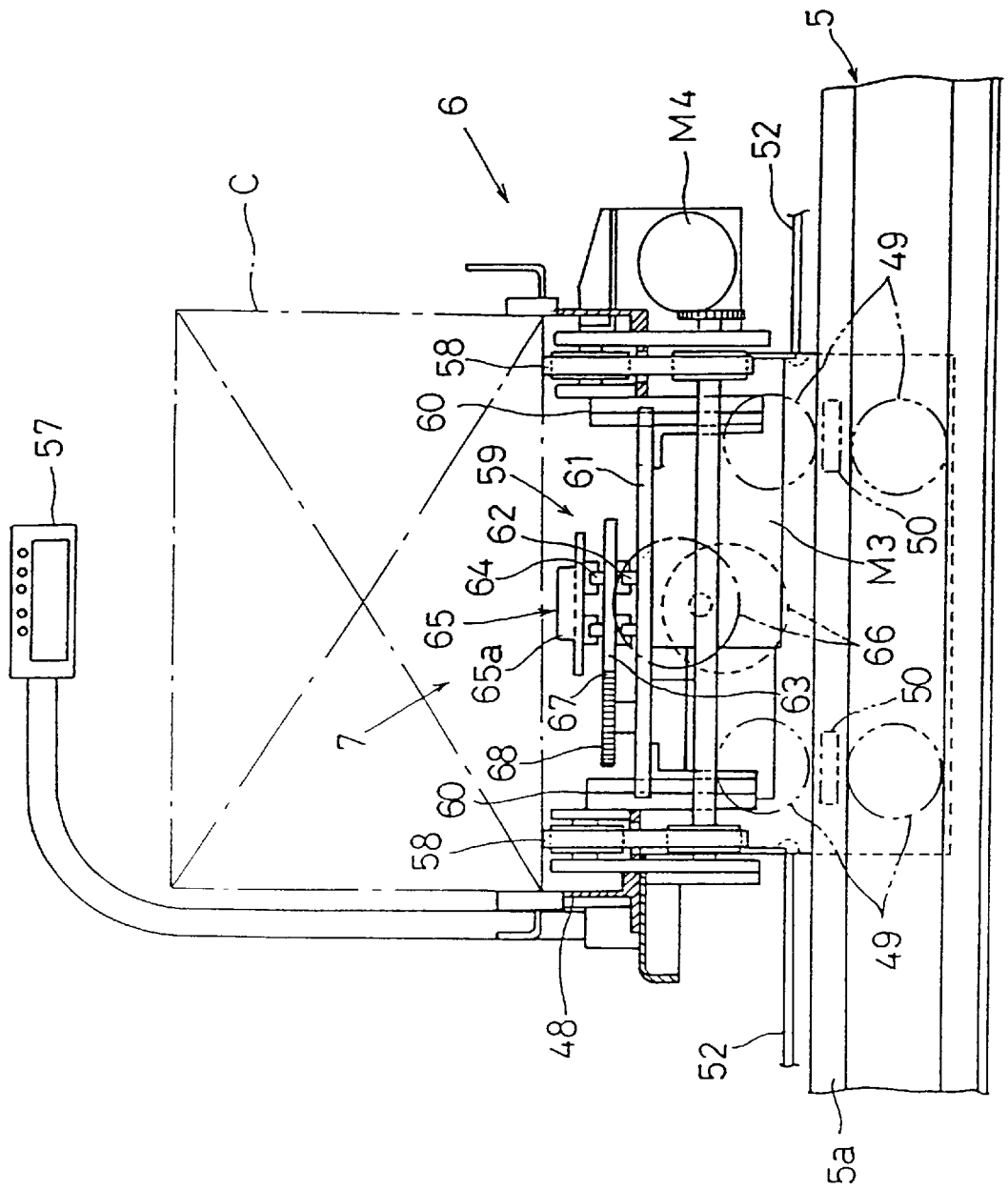
FIG. 13 is a front view of an article transfer device of a moving vehicle, as viewed forwardly of the storage apparatus.
Figure 14:
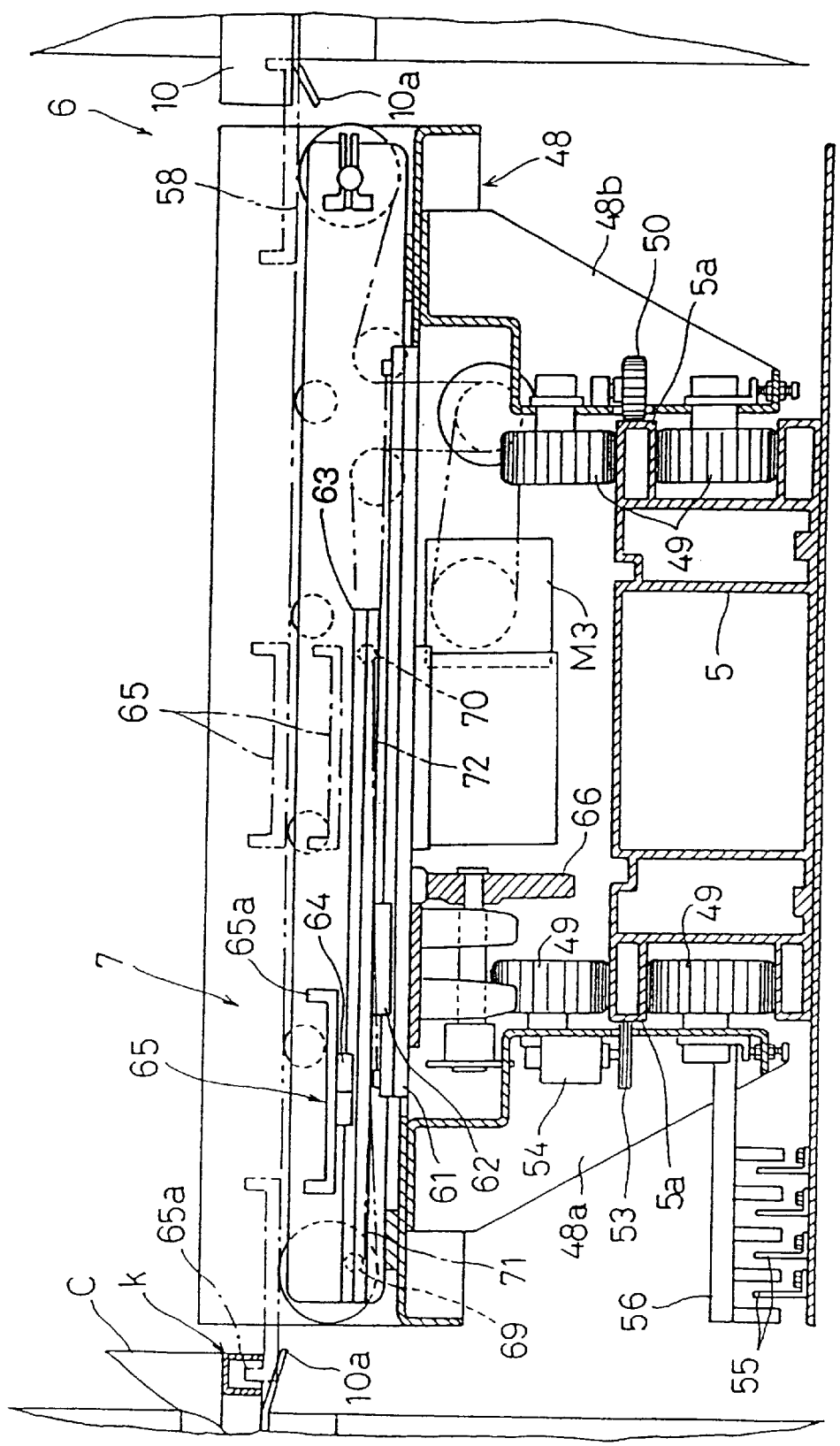
FIG. 14 is a side view of the article transfer device.

As shown in FIGS. 13 and 14, the moving body 6 includes a moving frame 48, and one of front and rear side frame members 48a, 48b constituting this moving frame 48 includes a ridge 5a laterally projecting to the side of the lift table 5, and also at two front and rear positions, an upper and lower pair of binding rollers 49, 49 for binding upper and lower opposed ends are supported to be rotatable about horizontal axes. With these binding rollers 49, 49, the moving body 6 is laterally guided while being prevented from floating upwards by means of the binding rollers 49, 49.

Moreover, each frame member 48a, 48b, at each of two lateral positions, rotatably supports rollers 50 which roll about vertical axes while sliding against and binding the front and rear opposed ends of the lift table 5.

And, as shown in FIGS. 6, 7, 10 and 11, opposed ends of a drive belt 52 entrained about pulleys 51, 51 supported to each of the opposed ends of the lift table 5, with each pulley being rotatable about a front-rear axis are connected to the moving body frame 48, and as one pulley 51 is rotatably driven by means of an electric motor M2 (an example of lateral movement operating means), the drive belt 52 is moved in the lateral direction, and in association therewith, the moving body 6 is moved in the lateral direction.

Incidentally, as shown in FIG. 14, the one side frame member 48a mounts a rotary encoder 54 for detecting an amount of lateral movement based on a rotational amount of a roller 53 sliding and rolling against the side face of the lift table 5, and also there is provided a transmission type photoelectric sensor 56 for determining the lateral movement stop position of the lift table 5 as the sensor is shielded by shielding plates 55 disposed at appropriate positions.

The moving body 6 includes a reflection type photoelectric presence/absence detecting sensor 57 for detecting whether a worker is present or not in the vicinity of the working section 3 at which a transfer operation is to be effected, when the container C is to be transferred to and from the article carrying in and out section 4.

Next, the article transfer device 7 for transferring an article between a storage section and the moving body 6 or between the working section 3 and the moving body 6 will be described.

Figure 15:
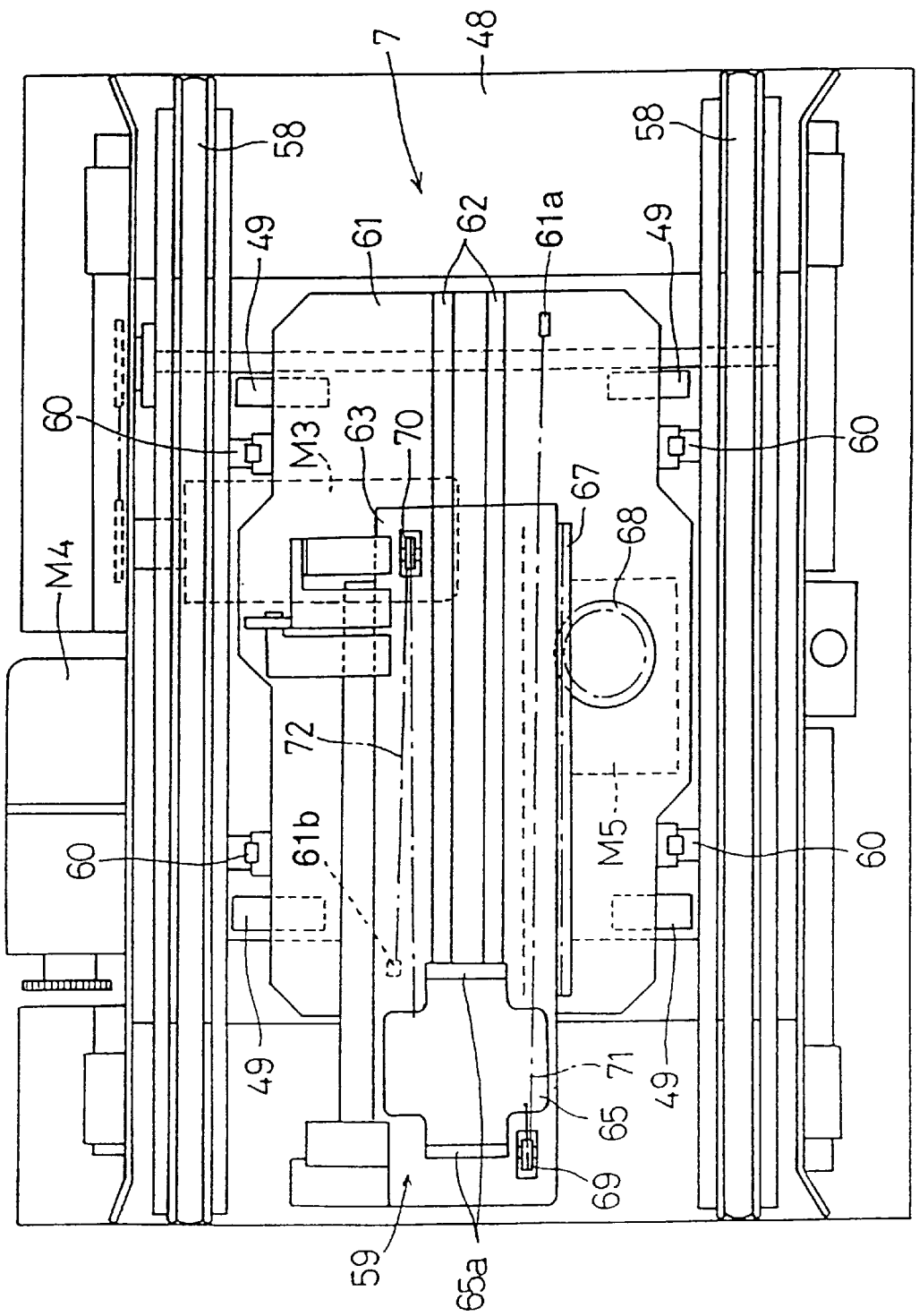
FIG. 15 is a plan view of the article transfer device.

As shown in FIGS. 13, 14 and 15, a pair of belt conveyers 58, 58 which are moved in the front-rear direction while mounting the container C thereon are driven by means of a single electric motor M3. At an intermediate position of each belt conveyer 58, 58, there is provided a retaining type transfer mechanism 59 for engaging and sliding the container C between a position where the container is to be transferred to the storage section 1 or the working section 3 and a further position where the container is to be transferred on to the article transfer device.

This retaining type transfer mechanism 59 includes a lift moving member 61 vertically movably supported by four vertically oriented guide rails 60 attached to the moving body frame 48. On this lift moving member 61, there is provided a slide plate 63 which is relatively slided in the front-rear direction along the guide rails attached on the member. Further, on this slide plate 63, there is provided a retaining member 65 which is relatively slidable in the front-rear direction along guide rails 64 attached on the slide plate 63. This retaining member 65 is formed by curving a plate member into a substantially angularly C-shaped cross section, with opposed end bent portions constituting container retaining portions 65a oriented upwards.

Then, the lift moving member 61, together with the slide plate 63 and the retaining member 65, is vertically moved between a retracted position where the container retaining portions 65a are located downwardly of the mounting face of the belt conveyers 58 and a retaining position projected more upward than the mounting face.

On the side of the slide plate 63, there is formed a rack gear 67, and a pinion gear 68 which meshes with this rack gear 67 is supported to the lift moving member 61 to be rotatable about a vertical axis. Then, as this pinion gear 68 is rotatably driven by an electric motor M5, the slide plate 63 is slided in the front and rear directions.

Further, to opposed ends of the slide plate 63 in the sliding direction thereof, there are supported sprockets 69, 70. As best shown in FIG. 15, one end of a roller chain 71 is connected to a rear portion of the retaining member 61. The roller chain 71 extends rearward to engage with the sprocket 69 and then extends forward, so that the other end of the roller chain 71 is connected to a stopper element 61a of the lift moving member 61. Also, one end of a further roller chain 72 is connected to the front portion of the retaining member 61. This roller chain 72 extends forwards to engage with the sprocket 70 and then extends rearward to be connected with a stopper element 61b of the lift moving member 61. Accordingly, when the slide plate 63 is slided in either of the front or rear direction, in association therewith the retaining member 65 is moved relative to the slide plate 63 in the same direction.

Next, a transfer operation of the container C by the article transfer device 7 having the above-described construction will be described.

First, there will be described the movements of the article transfer device 7 when the container C is transferred on to the moving body by this article transfer device 7.

From a ready condition in which the retaining member 61 is ready at a home position denoted by a solid line in FIG. 14, the electric motor M5 is driven to move the slide plate 63 and the retaining member 65 toward the container C mounted at either the storage section 1 or the article carrying in and out section 4. When the container retaining portions 65a are located downwardly of an engaging portion k of the container C, the motor M4 is driven to lift up the lift moving member 61, so that the container retaining portions 65a come into engagement with the engaging portion k of the container C. Under this condition, the slide plate 63 is moved in the opposite direction to slide the container C on to the article transfer device. In this, the respective belt conveyers 58, 58 are rotatably driven in synchronism with the retaining movement speed, so that the movement may be effected smoothly with reduced frictional resistance associated with the sliding movement. When the retaining member 65 is moved to the central position, the lift moving member 61 is lowered and then the container C is moved to a predetermined position by means of the belt conveyers 58, 58.

Figure 16:
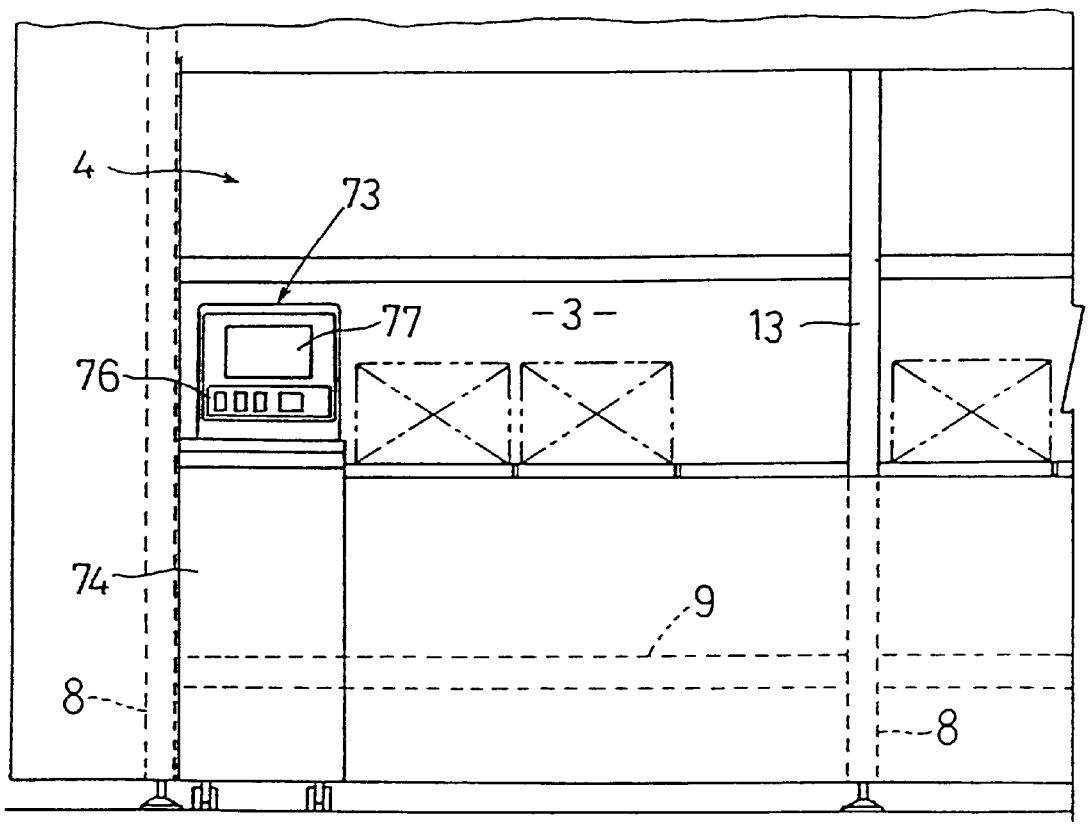
FIG. 16 is a front view showing the article carrying in and out section.

As shown in FIG. 16, there is provided a control unit 73 for controlling the lifting operation of the lift table 5, the lateral movement of the moving body 6 and the transfer movement of the article transfer device 7, by utilizing a part of the article carrying in and out section 4. This control unit 73 is supported to a substantially box-like support member 74 so as to be located in a substantially same level as each working table 12.

Next, the control operations by the control unit 73 will be briefly described.

The control unit 73 includes a control panel 76 and a display unit 77. And, a worker selects a work mode by a predetermined operation, i.e. designates any one of 'carry-in mode', 'carry-out mode', 'picking carry-out mode' and 'replenishing carry-in mode'. Incidentally, the picking carry-out mode is for carrying out a small number of parts, and the replenishing carry-in mode is a mode used for replenishing parts to be mounted within the container C. Detailed descriptions of these will be omitted.

When parts are to be carried into the storage section 1, the 'carry-in mode' is selected by the control panel 76, and the part number and a particular work section 3 at which the operation is to be effected are designated. With these, the control unit 73 looks for a vacant storage section 1 and drives the lifting electric motor M1 to lift the lift table 6 to a lift position corresponding to the particular storage section 1. In this, whether the table has been lifted to the corresponding position or not is detected by the rotary encoder 45 and the photoelectric sensor 47. Further, the control unit drives the lateral movement electric motor M2 to move laterally the moving body 6 to a position corresponding to the particular storage section 1. Whether the moving body has been moved to the corresponding position or not is detected by the rotary encoder 54 and the photoelectric sensor 56.

Then, by the above-described transfer operation by the article transfer device 7, the container C is transferred, and then in the same manner as above, the article transfer device 7 is moved to the designated working section 3 and the container C is mounted on the working table 12.

Incidentally, when the container C is transferred on to the working table 12, if the presence/absence sensor 57 detects that a worker is present within the working space, i.e. more inside than the outer face 78 of the apparatus, the container transfer operation is not effected. Whereas, if presence of a worker is not detected, the transfer operation is effected at a normal operation speed.

After completion of the carry-in operation and when the worker operates the operation completion switch 28, the container C under operation is stored into the predetermined storage section 1, whereby the operation is completed.

The operation completion switch 28 incorporates a lamp, and this lamp is kept illuminating while the lift operation of the lift table 5 or the lateral movement operation of the moving body 6 is being carried out, thereby to indicate the apparatus being under operation. And, when the switch 28 is operated, the lamp is turned off.

OTHER EMBODIMENTS (1) In the foregoing embodiment, the partition wall 13 is provided at the center of the article carrying in and out section 4. Instead, by constructing the upper wall constituting the working space from a rigid member, the construction may do without the partition wall.

Further, in the foregoing embodiment, the article carrying in and out section 4 is provided over substantially the entire lateral width of the storage shelf. Instead, the article carrying in and out section 4 may be constructed by using only a portion of the lateral width of the storage shelf so as to extend over a plurality of working sections 3.

Figure 17:
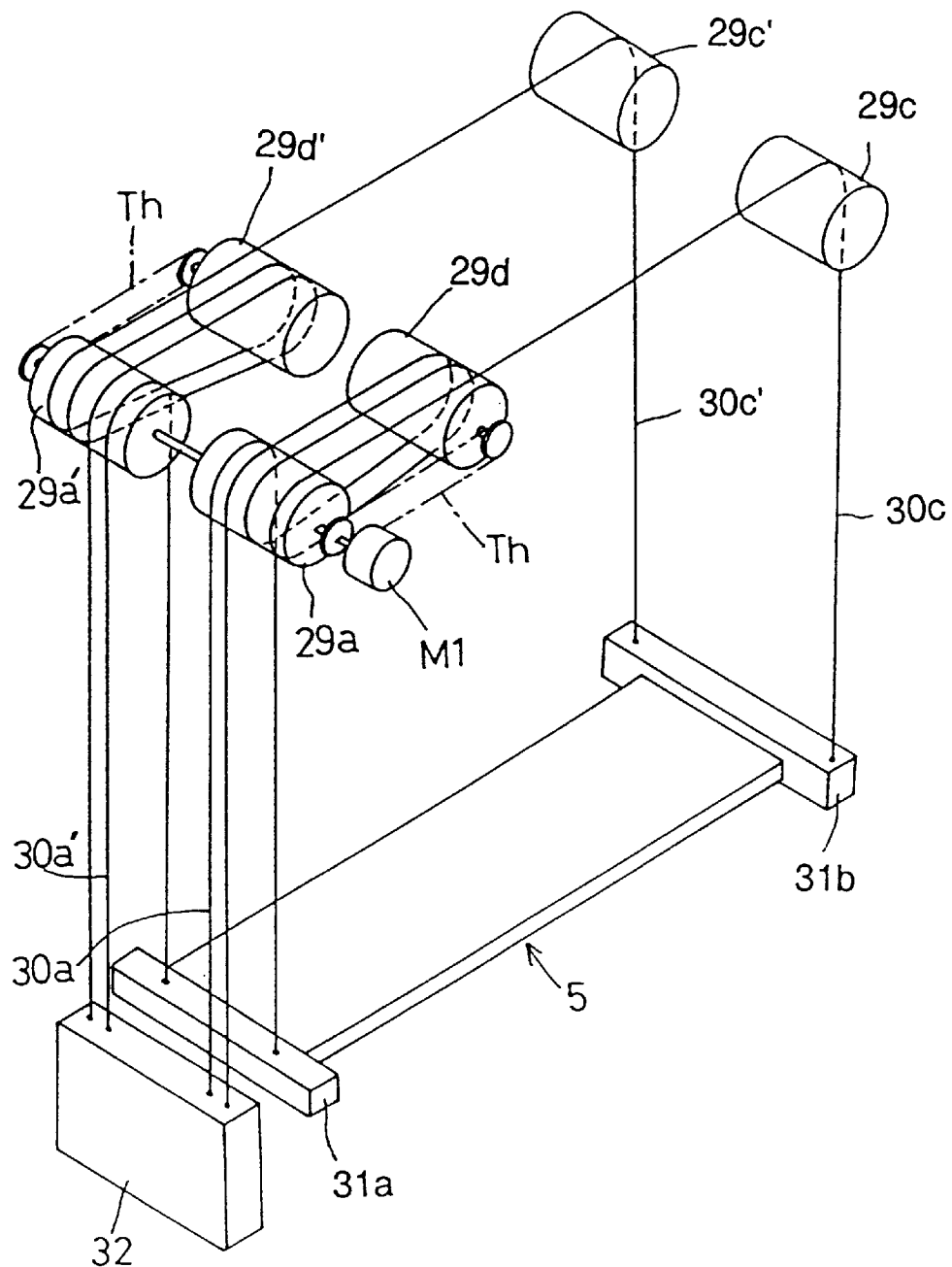
FIG. 17 is a perspective view showing a support construction for the lift table according to a further embodiment.

(2) In the foregoing embodiment, the lift table 5 is supported by the total six connecting wires 30a, 30a', 30b, 30b', 30c, 30c'. Instead, as shown in FIG. 17, with eliminating the wires 30b, 30b', the lift table 5 may be supported by only four connecting wires. The guide drums 29b, 29b' corresponding thereto are also eliminated in this further embodiment.

Figure 18:
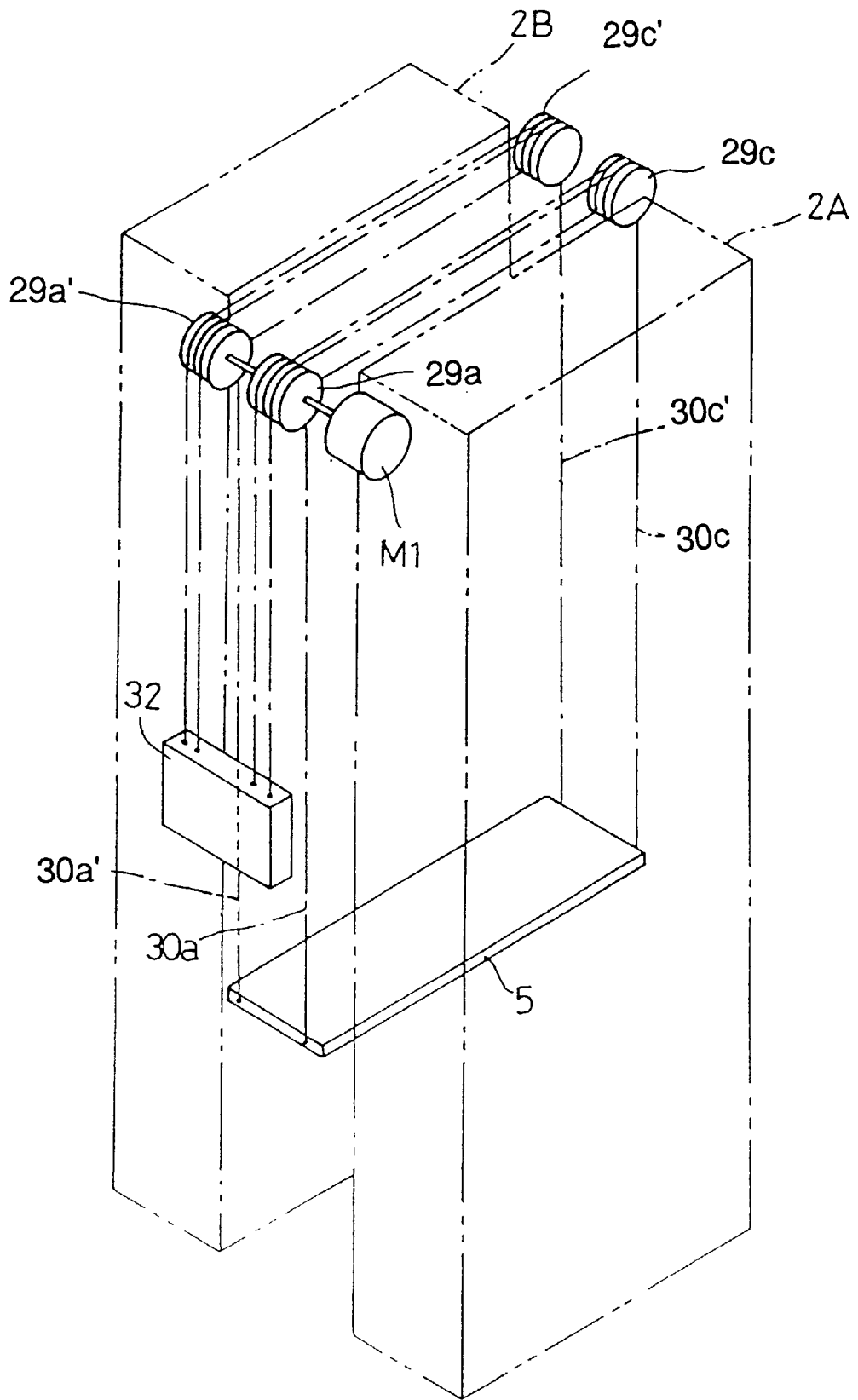
FIG. 18 is a perspective view showing a support construction for the lift table according to a still further embodiment.

(3) Further, as shown in FIG. 18, it is also conceivable to eliminate the auxiliary guide drums 29d, 29d' from the above-described further embodiment.

Figure 19:
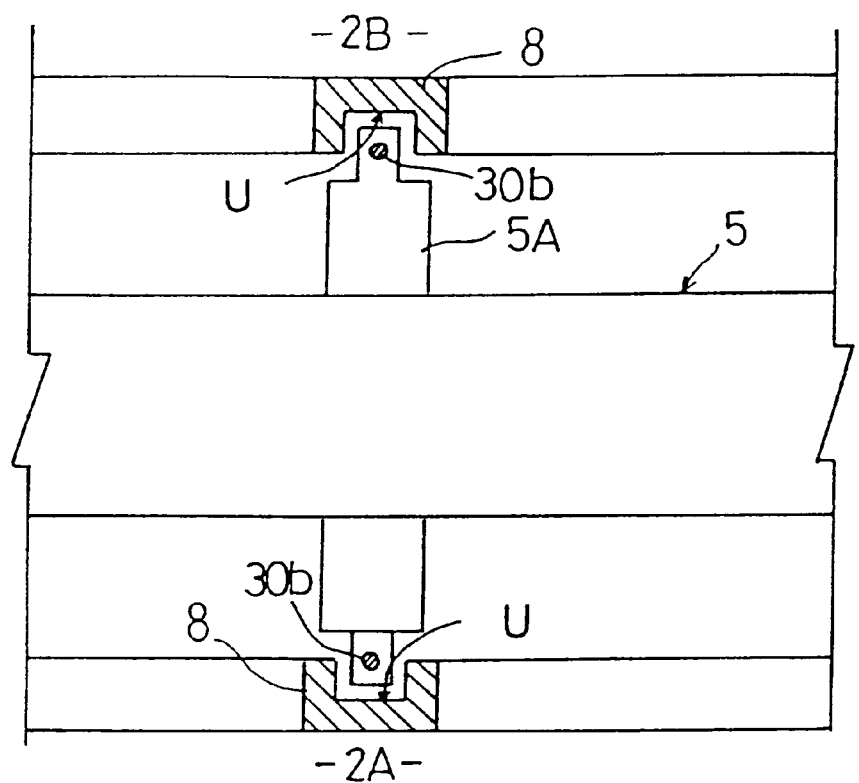
FIG. 19 is a plan view showing a support arm of the lift table according to a further embodiment.

(4) In the foregoing embodiment, the respective connecting wires 30a, 30a', 30b, 30b', 30c, 30c' are disposed within the lift passage of the lift table 5 provided between the respective storage shelves 2A, 2B. An alternative construction is possible as follows. In this construction, the connecting wires 30a, 30a', 30c, 30c' on the opposed ends are disposed farther from an end face L of each storage shelf 2A, 2B on the side of the lift table 5 away in the front-rear direction from the lift table 5, i.e. at the positions overlapping with the respective storage shelves 2A, 2B as viewed in the lateral direction, and also, as shown in FIG. 19, in the post 8 disposed in the lateral middle position on the side of the lift table 5, there is formed a recess U formed concave in the front-rear direction and on the side away from the lift table 5, so that the intermediate connecting wire 30b is fitted into this recess U and supported in suspension.

With the above-described construction, the respective connecting wires 30a, 30b, 30c are located inwardly of the end face L of each storage shelf, i.e. on the outer side from the lift passage of the lift table 5. Then, when a worker enters the lift passage for a maintenance or checking operation, the worker may carry out the operation safely without the risk of his/her body coming into contact with the wires.

(5) In the foregoing embodiment, there is provided the one balance weight 32. Instead, the balance weight 32 may be divided into two to be distributed to the front and rear opposed ends, with each divided balance weight being disposed at a position farther from the end face L of the storage shelf 2A, 2B on the side of the lift table 5 away in the front-rear direction from the lift table 5.

With the above-described construction, in the course of the maintenance or checking operation as described above, the lift passage for the balance weight 32 is not present at the entrance to the lift passage, so that the safety of the operation may be improved.

(6) In the foregoing embodiment, the balance weight is connected with the other ends of the respective connecting wires (wire members). Instead of such construction, the respective connecting wires may be longitudinally moved by alternatively effecting a take-up operation and a feed operation by rotationally driving the corresponding entraining guide members in synchronism by means of the lift drive means.

(7) In the foregoing embodiment, the wires as the wire members are entrained about and guided on the entraining guide members provided in the form of pulleys. In place of such construction, chains as wire members may be entrained about and guided on sprocket type entraining guide members.

(8) In the foregoing embodiment, the retaining members 10 are attached to the pair of lateral frames 9 in the same level, thereby to constitute the storage sections 1. Instead, the storage section 1 may be formed by disposing vertically extending posts at the four corners of each storage section 1 and bridging the retaining member across the front and rear posts.

(9) In the foregoing embodiment, the working table 12 is adapted to be slidable. Instead, the working table 12 may be fixed in position.

(10) In the foregoing embodiment, the article transfer device includes the retaining type transfer mechanism to retaining and sliding the article. In place of such construction, a fork type transfer mechanism may be employed. In this case, extendible and contractible forks will be introduced under the article, and the lift table 5 or the transfer mechanism will be slightly raised to mount and support the article. Then, by retracting the forks, the article may be transferred.

(11) In the foregoing embodiment, the control unit 73 is provided in the article carrying in and out section 4. Instead, the control unit may be provided separately outside the apparatus.

(12) In the foregoing embodiment, the container for mounting small size parts is described as the article to be stored. Instead, the construction may be adapted to store a single article having a predetermined shape as the article. The specific construction of the article is not particularly limited. Incidentally, in the case of storing a single article as described above, the article mounting face of the respective storage section or of the article transfer device will be formed flat.

(13) In the foregoing embodiment, the lift guide for liftably guiding the lift table is provided to the post on the rear storage shelf. Instead, the lift guide may be provided to the post of the front storage shelf.

Figure 20:
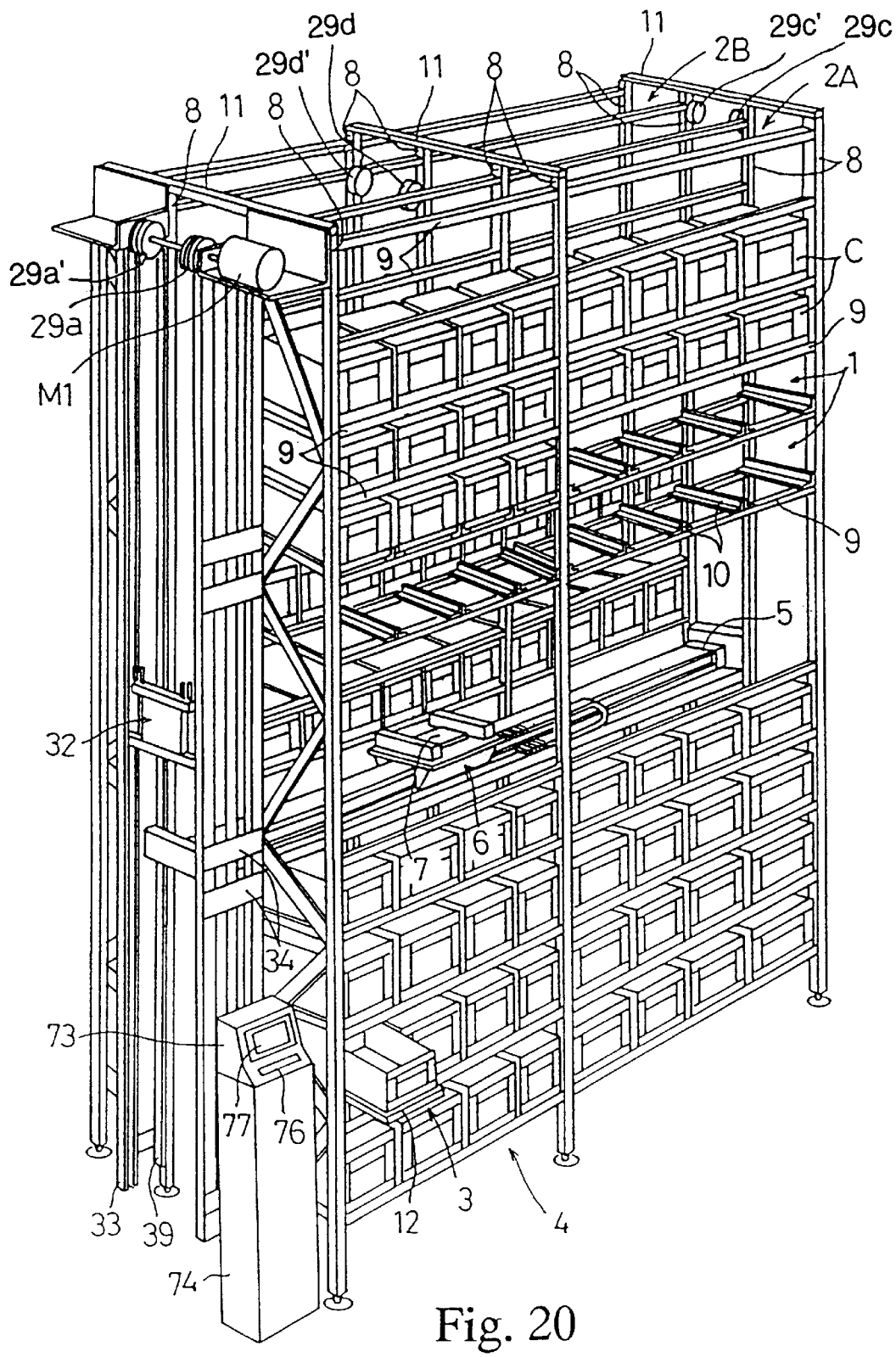
FIG. 20 is a perspective view of a storage apparatus according to a second embodiment of the invention.

(14) In the foregoing embodiment, in each working space, a plurality of working spaces corresponding to the width of a plurality of storage sections 1 extend continuously from each other to provide a large open space, so that the carrying in and out operations of containers C may be readily carried out without being interfered with by any objects. Instead, an alternative construction or second embodiment of the present invention, shown in FIG. 20 may be employed. In this case, the article carrying in and out section 4 is provided at a lower region of the front-side storage shelf 2A at a level (in this embodiment, the second level from the bottom) where the worker may readily effect the carrying in and out operations, by utilizing a half of the plurality of storage sections 1 arranged side by side horizontally in a row. And, at the storage section 1, the container mounting table 12 is provided to be slidable between a storing position where the article transfer device 7 effects the transfer operation and a projecting position projecting outward in the front-rear direction where a carrying in or out operation for carrying in the container C from the outside and then transferring it or carrying out the mounted container C to the outside is effected.

Figure 21:
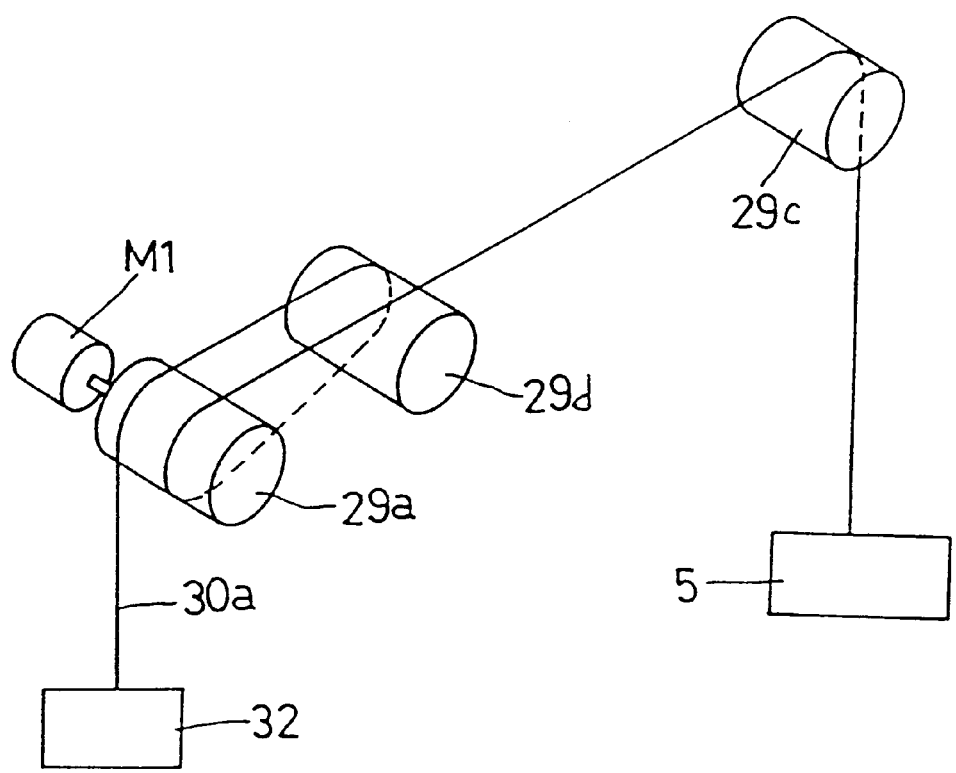
FIG. 21 is a schematic view showing a support construction for the lift table according to the second embodiment.

(15) In the foregoing embodiment in paragraph (14), the lifted member (lift table) is formed as an elongate member. Instead, as shown in FIG. 21, if opposed ends of the wire member 30a are suspended across a pair of rotary guiding members disposed horizontally apart from each other with the lifted member 5 being connected to the one end and the balance weight 32 being connected to the other end, the specific shape of the lifted member is not particularly limited.

(16) In the storage apparatus according to the present invention, the lift table may be supported by the six connecting wires or the four connecting wires as described hereinbefore. However, as long as the lift table can be lifted with maintaining its horizontal posture relative to the ground, the lift table may be supported by two connecting wires also. In this case, it is conceivable to attach guide means such as a guide rail attached to the storage shelf, so as to maintain the balance of the lift table appropriately.

(17) In the foregoing embodiment, the present invention is applied to a storage apparatus. Instead, the present invention may be applied to a multi-story parking system for lifting up and down an automobile as an article. In the case of the conventional storage apparatus, the number of posts 8 was increased so as to improve the strength. In the case of the present invention, however, by limiting the number of the posts 8 to such a degree as not to impair the strength, the working space at the article carrying in and out section has been enlarged.

What is claimed is:
1. A storage apparatus, comprising:
first and second storage shelves (2A), (2B) disposed with a distance therebetween in a front-rear direction, each storage shelf including a predetermined number of horizontal arrays disposed vertically, each horizontal array having a plurality of storage units (1) for storing articles (C);
a lift table (5) disposed within the space between the pair of storage shelves (2A), (2B) and movable along a vertical direction of the storage shelves (2A), (2B);
lift operating means for lifting up and down the lift table (5);
a moving body (6) mounted on the lift table (5) to be movable in a horizontal direction with respect to the lift table (5);
horizontal movement operating means (M2) for allowing horizontal movement of the moving body (6) relative to the lift table (5);

an article transfer device (7) mounted on the moving body (6) for moving the articles (C) between the storage unit (1) and the moving body (6); and
an article carrying in and out section (4) formed between front and rear faces of the first storage shelf (2A), the article carrying in and out section having at least one uninterrupted opening having a width corresponding to a plurality of storage units (1).

2. A storage apparatus as defined in claim 1, wherein the article carrying in and out section (4) includes a working table (12), the working table (12) being displaceable between a transfer position where the article transfer device (7) effects transfer of the articles (C) and a carrying in and out position displaced more forwardly of the storage apparatus than the transfer position.

3. A storage apparatus as defined in claim 2, wherein the working table (12) has a same width as the storage unit (1).

4. A storage apparatus as defined in claim 2, wherein the article carrying in and out section (4) further includes:
a guide means (15) for guiding the working table (12) between the transfer position and the carrying in and out position; and
a roller means (17, 19) disposed between the guide means (15) and the working table (12).

5. A storage apparatus as defined in claim 1, wherein the article transfer device (7) includes a transfer mechanism (59) for sliding the articles (C) between a position for transferring the articles to the storage unit (1) and a position for transferring the articles on to the article transfer device.

6. A storage apparatus as defined in claim 1, wherein the lift operating means includes first and second connecting wires (30a), (30c) for supporting the lift table and first and second guide members (29a), (29c) attached to upper portions of the first storage shelf (2A), the first and second guide members (29a), (29c) engaging with the first and second connecting wires (30a), (30c), and wherein the first guide member (29a) is operatively connected with drive means (M1).

7. A storage apparatus as defined in claim 6, wherein the lift operating means further includes third and fourth connecting wires (30a'), (30c') and third and fourth guide members (29a'), (29c') attached to upper portions of the second storage shelf (2B), the third and fourth guide members (29a'), (29c') engaging with the third and fourth connecting wires (30a'), (30c').

8. A storage apparatus as defined in claim 7, wherein the lift operating means further includes a first auxiliary guide member (29d), and wherein the first guide member (29a) and the first auxiliary guide member (29d) are located within a loop formed by the second connecting wire (30c).

9. A storage apparatus as defined in claim 8, further comprising synchronized drive means (Th) for driving the first auxiliary guide member (29d) and the first guide member (29a) in synchronism by the drive means (M1).

10. A storage apparatus as defined in claim 8, wherein the lift operating means further includes a second auxiliary guide member (29d'), and wherein the third guide member (29a') and the second auxiliary guide member (29d') are located within a loop formed by the fourth connecting wire (30c').

11. A storage apparatus as defined in claim 8, wherein the guide members are pulleys.

12. A storage apparatus as defined in claim 7, wherein the lift operating means further includes a fifth connecting wire (30b) and a fifth guide member (29b) engaging with the fifth connecting wire (30b), one end of the fifth connecting wire (30b) being connected to the lift table (5) in the vicinity of a horizontal center of the lift table (5).

13. A storage apparatus as defined in claim 12, wherein the lift operating means further includes a sixth connecting wire (30b') and a sixth guide member (29b') engaging with the sixth connecting wire (30b'), one end of the sixth connecting wire (30b') being connected to the lift table (5) in the vicinity of the horizontal center of the lift table (5).

14. A storage apparatus as defined in claim 6, wherein the lift operating means includes a balance weight (32) and a first auxiliary member (29d), wherein the first guide member (29a) and the first auxiliary member (29d) are located in a loop formed by the second connecting wire, and wherein the second connecting wire (30c) extends upward from the lift table (5) to come into contact with a quarter portion of the outer periphery of the second guide member (29c), extends horizontally toward the first guide member (29a) to come into contact with a half portion of the outer periphery of the first guide member (29a), extends horizontally toward the first auxiliary guide member (29d) to come into contact with a half portion of the outer periphery of the first auxiliary guide member (29d), extends horizontally toward the first guide member (29a) to come into contact with a quarter portion of the outer periphery of the first guide member (29a) and then extends downward to be connected with the balance weight (32).

15. A storage apparatus as defined in claim 6, wherein the lift operating means further includes a first auxiliary guide member (29d), and wherein the first guide member (29a) and the first auxiliary guide member (29d) are located within a loop formed by the second connecting wire (30c), and the storage apparatus further comprising synchronized drive means (Th) for driving the first auxiliary guide member (29d) and the first guide member (29a) in synchronism by the drive means (M1).

16. A storage apparatus as defined in claim 1, wherein at each of front and rear faces of the first and second storage shelves (2A), (2B), there are at least three vertical frames (8) extending vertically at the opposed ends and the center of the horizontal direction.

17. A storage apparatus as defined in claim 16, wherein at each of the front and rear faces of the first and second storage shelves (2A), (2B), there is provided a lateral frame (9) extending between the vertical frames at positions corresponding to the respective faces.

18. A storage apparatus as defined in claim 17, wherein each of the first and second storage shelves (2A), (2B) includes retaining members (10) extending across the corresponding lateral frames (9) of the front and rear faces of the first and second storage shelves (2A), (2B).

19. A storage apparatus as defined in claim 1, wherein the moving body (6) includes a sensor (57) for detecting whether a worker is present or not in the vicinity of the article carrying in and out section (4) when the moving body (6) is located in the article carrying in and out section (4).

20. A storage apparatus as defined in claim 1, wherein at the front face there is provided a plurality of spaced apart posts extending in the vertical direction.

21. A storage apparatus as defined in claim 1, wherein at the article carrying in and out section or the vicinity thereof, an operation completion switch is provided to be operated by a worker at the completion of a carry-in operation.

22. A storage apparatus as defined in claim 1, wherein the article carrying in and out section (4) has a plurality of uninterrupted openings each having a width corresponding to a plurality of storage units (1).

23. A storage apparatus as defined in claim 1, wherein the article carrying in and out section (4) has two uninterrupted openings each having a width corresponding to a plurality of storage units (1).

24. A storage apparatus as defined in claim 1, wherein the at least one uninterrupted opening is wide enough to accommodate two storing articles (C) each with a width corresponding to a single storage unit (1).

* * * * *